US012588682B2

(12) United States Patent
Da Silva Choai

(10) Patent No.: US 12,588,682 B2
(45) Date of Patent: Mar. 31, 2026

(54) POSITIONING EQUIPMENT AND METHOD FOR POULTRY AND SIMILAR ANIMALS

(71) Applicant: Orlei Da Silva Choai, Flonanopolis (BR)

(72) Inventor: Orlei Da Silva Choai, Flonanopolis (BR)

( * ) Notice: Subject to any disclaimer, the term of this patent is extended or adjusted under 35 U.S.C. 154(b) by 147 days.

(21) Appl. No.: 18/681,431

(22) PCT Filed: Aug. 4, 2021

(86) PCT No.: PCT/BR2021/050327
§ 371 (c)(1),
(2) Date: Sep. 26, 2024

(87) PCT Pub. No.: WO2023/010184
PCT Pub. Date: Feb. 9, 2023

(65) Prior Publication Data
US 2025/0017222 A1 Jan. 16, 2025

(51) Int. Cl.
*A22C 21/00* (2006.01)

(52) U.S. Cl.
CPC ...... *A22C 21/0053* (2013.01); *A22C 21/0046* (2013.01)

(58) Field of Classification Search
CPC . A22C 21/00; A22C 21/0053; A22C 21/0047; A22B 7/00; B65G 47/24; B65G 47/26
USPC .......................................................... 452/177
See application file for complete search history.

(56) References Cited

U.S. PATENT DOCUMENTS

2010/0009614 A1 * 1/2010 Hansen ................ A22C 17/004
452/154
2019/0047730 A1 * 2/2019 Van Der Steen ....... B65B 43/60
2020/0247618 A1 * 8/2020 Richards ................ A22C 21/06

FOREIGN PATENT DOCUMENTS

| BR | 102019014661 A2 | 1/2021 |
|---|---|---|
| BR | 102020003277 A2 | 8/2021 |
| EP | 0576076 A1 | 12/1993 |
| WO | WO0041568 A2 | 7/2000 |
| WO | WO2008058069 A2 | 5/2008 |

* cited by examiner

*Primary Examiner* — Richard T Price, Jr.
(74) *Attorney, Agent, or Firm* — MUNCY, GEISSLER, OLDS & LOWE, P.C.

(57) ABSTRACT
Equipment and a method for positioning fowl that are intended to collect the processed and slaughtered animal from a horizontal conveyor belt previously aligned along the longitudinal axis, and to position the bird vertically for subsequent processing.

20 Claims, 44 Drawing Sheets

40

41

47

53

54

55

53

531

52

532

533

53

531

521

532

533

532

533

52

532

521

50

50

40

POSITIONING EQUIPMENT AND METHOD FOR POULTRY AND SIMILAR ANIMALS

FIELD OF DISCLOSURE

In general, this invention belongs to the poultry sector and refers, more specifically, to a poultry positioning equipment and method that aims to collect the processed and slaughtered animal, coming from a horizontal and pre-aligned conveyor belt on the longitudinal axis, and place it in a vertical position to continue on to the other processes.

BACKGROUND OF THE INVENTION

In 2015, Brazil surpassed China and became the world's second largest producer of chicken meat, second only to the United States (USA). The figures from the Brazilian Institute of Geography and Statistics (IBGE) indicate that Brazil produced 13.14 million tons in that year, a volume 5.4% higher than in 2014 and the highest ever recorded in the country's history. No less than 5.8 billion chicken heads were slaughtered in national territory.

Despite producing fewer chickens than the United States, the country has been the largest force in the international trade of this product for some time now. For every eleven kilograms exported globally, approximately four kilograms come from Brazil. Product from Brazil can now be found in 150 countries on all continents.

To this end, the slaughtering and industrialization of poultry is notoriously one of the activities responsible for making the most workers ill in the country. The hundreds of thousands of employees in the sector often deal with several risk factors: Constant exposure to knives, saws and other sharp instruments; Repetitive movements that can generate serious injuries and diseases; Psychological pressure to cope with the high pace imposed by production lines; Workdays often exceeding the daily limit established by law; Closed, asphyxiating and very cold environments.

In April 2013, new rules were approved to improve working conditions in meat packing plants and slaughterhouses in the country. As a result of pressure from various entities to reduce health risks related to the sector, Regulatory Standard (NR) 36 established several new guidelines for the operation of meat packing plants. The following stand out: The provision of breaks throughout the day for workers to rest their muscles; Ergonomic and safety adjustments to conveyor belts and other machinery in factories; Rules to reduce workers' exposure to excessively cold environments, as well as to mitigate thermal discomfort; Adjustment of workstations so that, whenever possible, seated work is alternated with standing work.

In recent decades, chicken production has become increasingly important on the menu of Brazilian agribusiness products. It is a sector that, in 15 years, doubled its production volume, quadrupled exports and gained increasing weight in the trade balance-fresh chicken was the fourth most exported product by Brazil in 2015.

However, several links in the poultry production chain still do not ensure sufficiently dignified and secure employment and income conditions for workers. The position of integrated poultry farmers, chicken trappers and industry workers shows this reality, and exemplifies how the fruits of the sector's growth are distributed in a very heterogeneous way.

To address this scenario of inequality in the chicken production chain, the demands of poultry farmers and workers need to be part of the agenda of corporate and government policies for the sector. This opens up room to develop equipment and machinery to help workers in the sector and companies in the poultry production sector.

In view of this, some technologies provide technical solutions to these problems, as presented in patent document No. BR 102019014661-3, which discloses a rotating system for directing chickens coming from a conveyor belt, however the central axis is not repositioned and the chicken arrives at the positioner in a random position. Furthermore, the revealed positioner is entirely manual, requiring an operator who, with both hands on the positioner, receives the poultry and directs it vertically without any parameters for the subsequent stage. In other words, automated equipment with sensors that read the positioning of the poultry and that does not require manual operations, with little practicality and requiring repetitive movements from workers. In addition, as we know, current production in slaughterhouses is around 70 to 180 thousand poultry a day, with each one weighing 2.5 to 3 kg, so this invention, which requires manual labor, would continue to harm operators in the sector.

SUMMARY OF THE INVENTION

In general, this invention belongs to the poultry sector, and refers, more specifically, to a poultry positioning equipment and method that aims to collect the processed and slaughtered animal, coming from a horizontal and pre-aligned conveyor belt on the longitudinal axis, and place it in a vertical position in recipients to continue the other processes.

For this, the equipment has a collecting conveyor belt that receives the poultry and an aligning belt that forces the poultry to pass through a guide so that the longitudinal axis of the poultry coincides with the longitudinal direction of the next conveyor. It also has a camera sensor that identifies the position of the poultry and sends a signal to pick up the poultry and position it.

There is at least one vertical positioner that collects the poultry from the conveyor belt with a collecting vane that leads it to a horizontal tilting board, and when activated, allows the poultry to be directed to the correct side so that the poultry is "upright" or "upside down" and soon after that, it is placed into a container that keeps the poultry in this adjusted position.

Alternatively, a modality with the same function is presented, with a guillotine at the top of the poultry positioner that opens onto the vane and accommodates the poultry in a vertical direction, and the vane alternates between two positions depending on the decision made by the camera sensor.

BRIEF DESCRIPTION OF THE DRAWINGS

For this invention to be fully understood and put into practice by any technician in this technological sector, it will be described in a clear, concise and sufficient manner, based on the attached drawings, illustrating and supporting it, listed below.

DETAILED DESCRIPTION OF THE INVENTION

Figure 1:
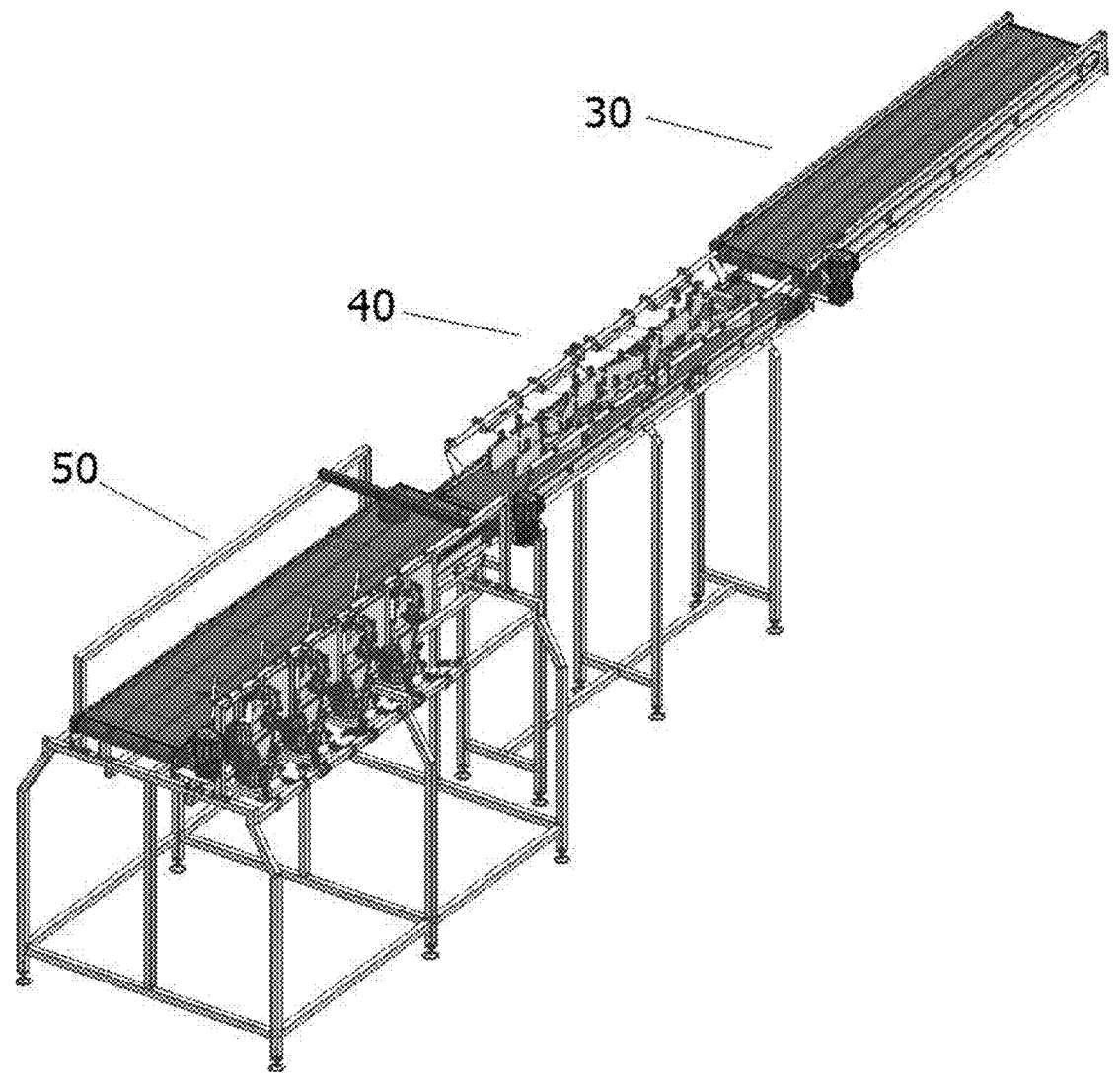
FIG. 1 depicts the rear perspective view of the poultry positioner.
Figure 2:
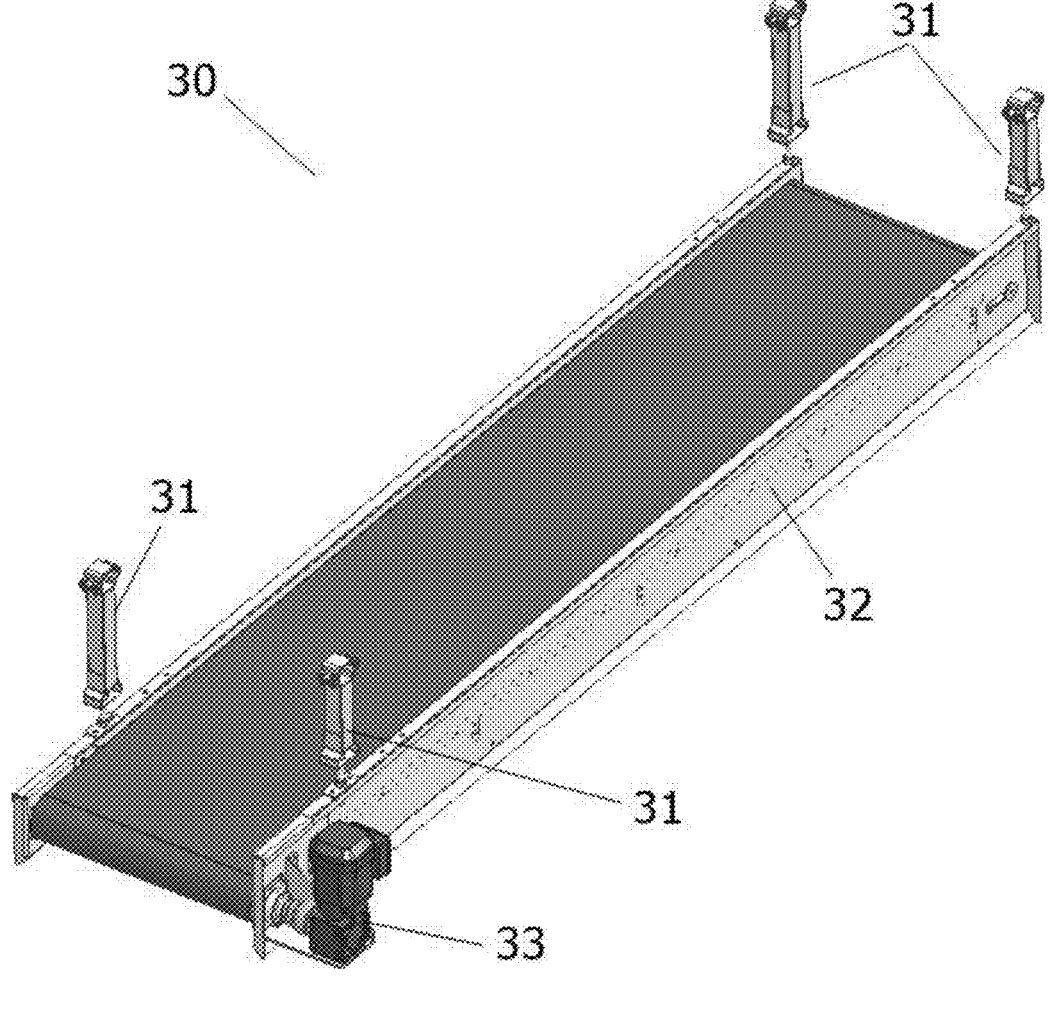
FIG. 2 depicts the rear perspective view of the collector conveyor belt with the hangers.
Figure 3:
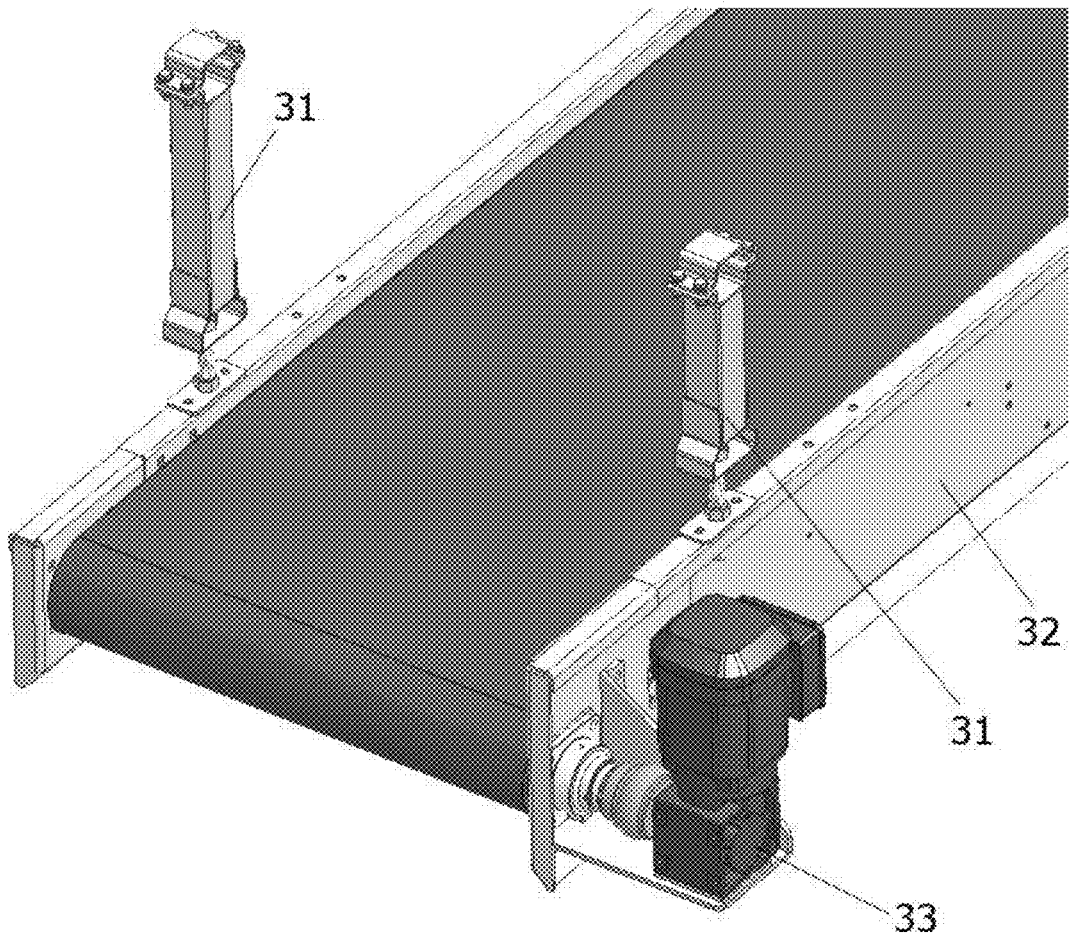
FIG. 3 depicts the rear perspective view of the collector conveyor belt with emphasis on the hangers and activation mode.
Figure 4:
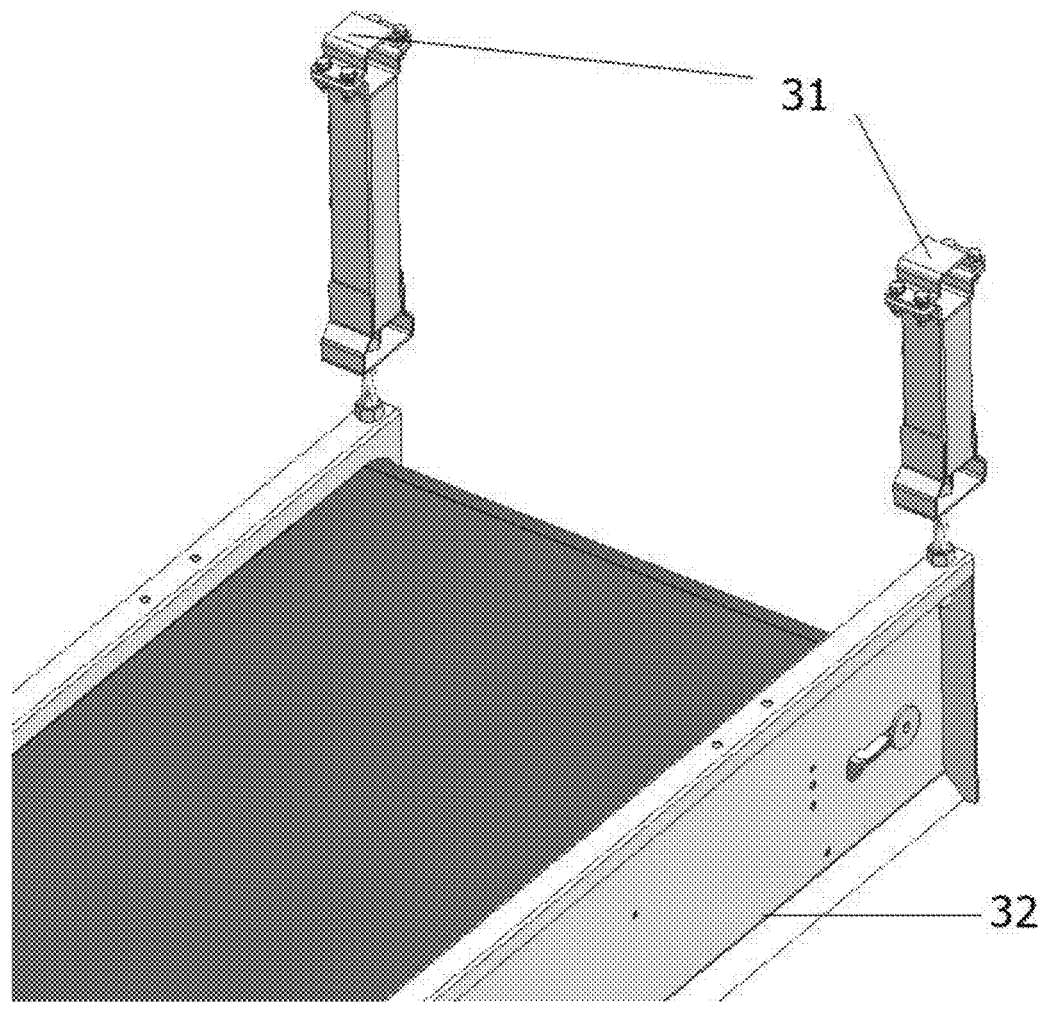
FIG. 4 depicts the rear perspective view of the collector conveyor belt with emphasis on the hangers.
Figure 5:
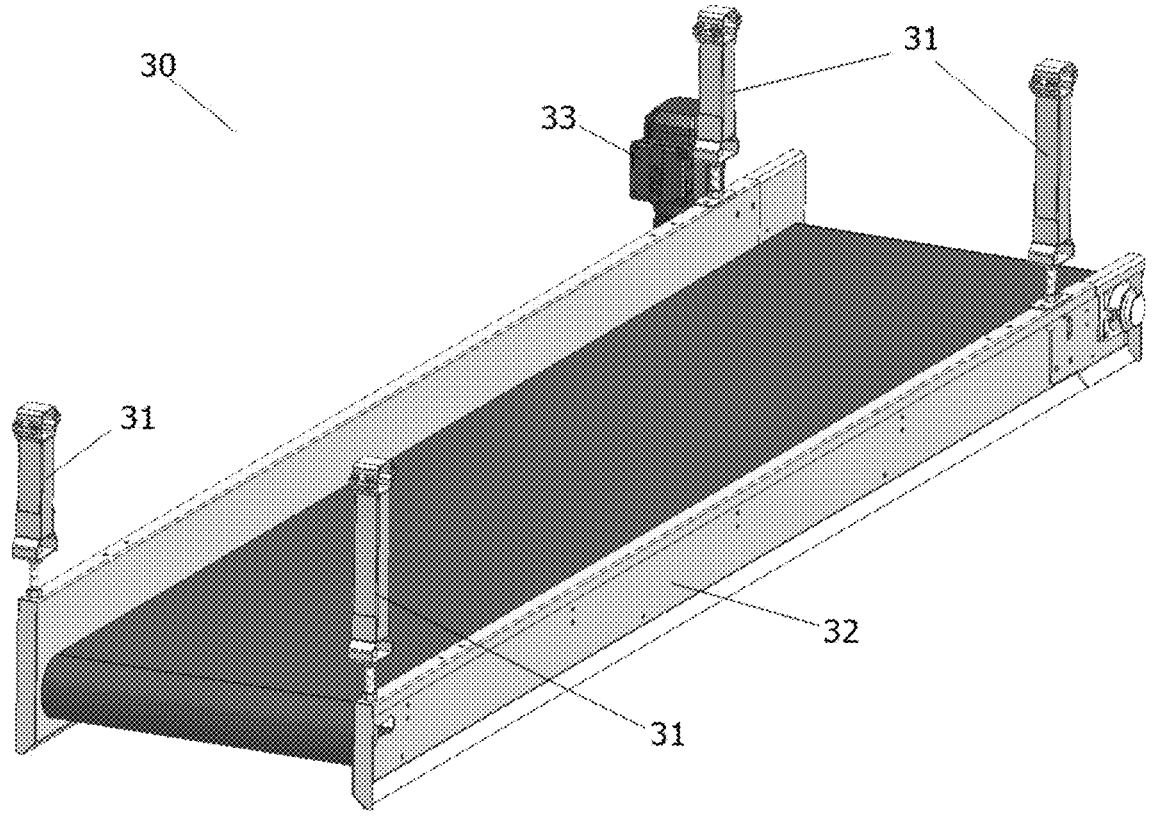
FIG. 5 depicts the front perspective view of the collector conveyor belt with the hangers.
Figure 6:
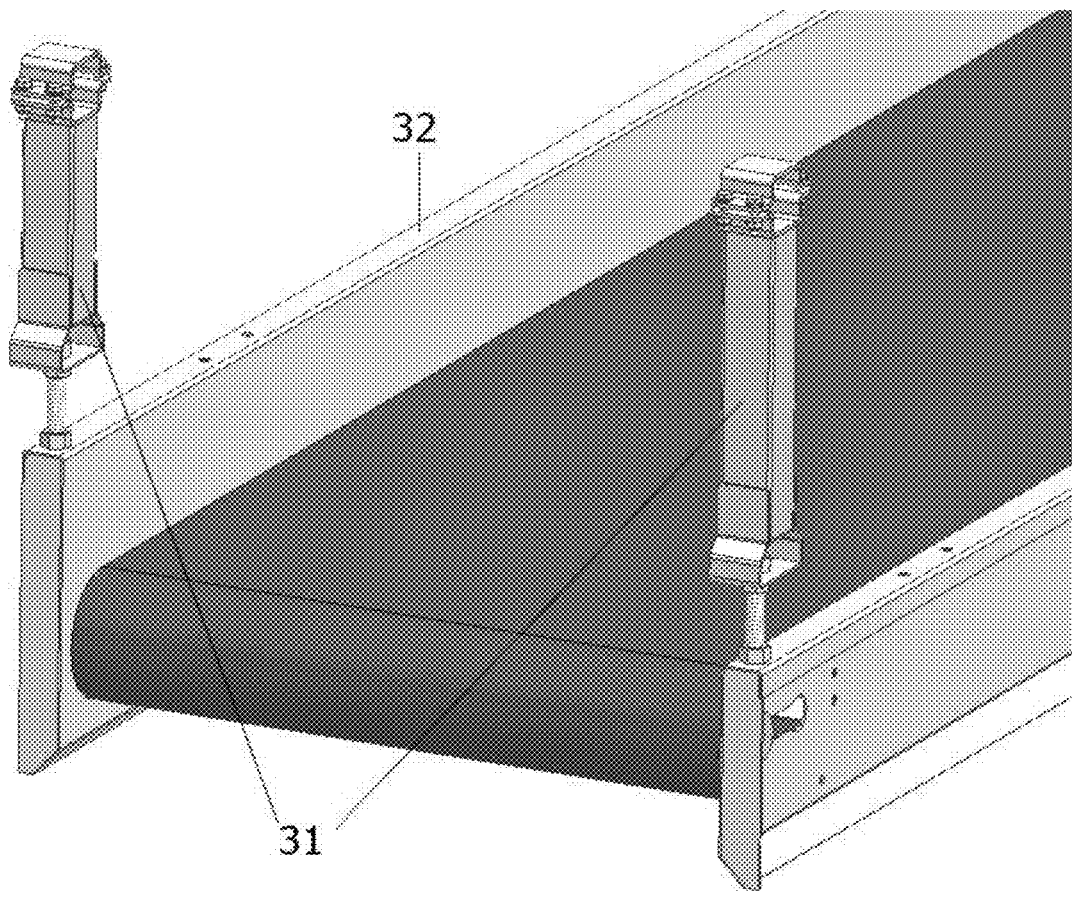
FIG. 6 depicts the front perspective view of the collector conveyor belt with emphasis on the hangers.
Figure 7:
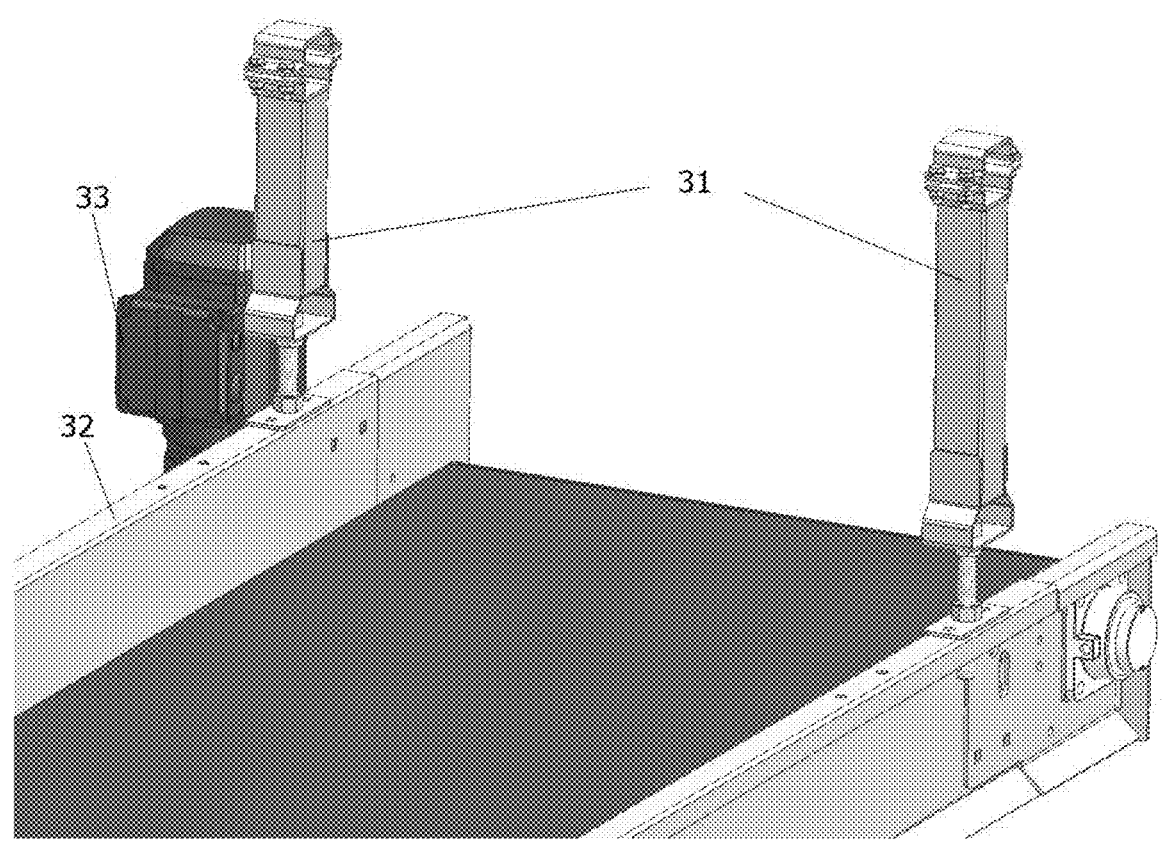
FIG. 7 depicts the front perspective view of the collector conveyor belt with emphasis on the hangers and activation mode.
Figure 8:
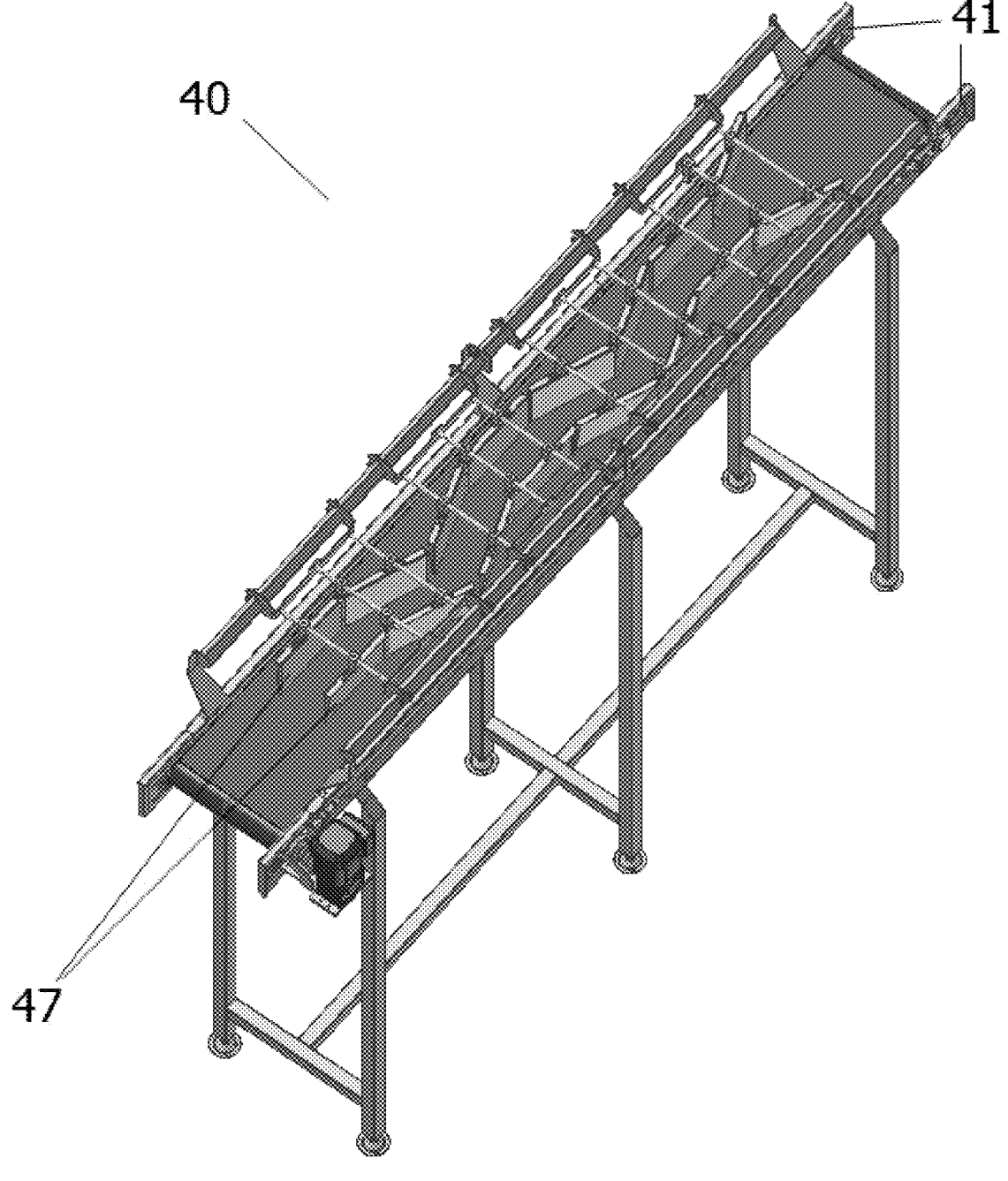
FIG. 8 depicts the rear perspective view of the aligning belt.
Figure 9:
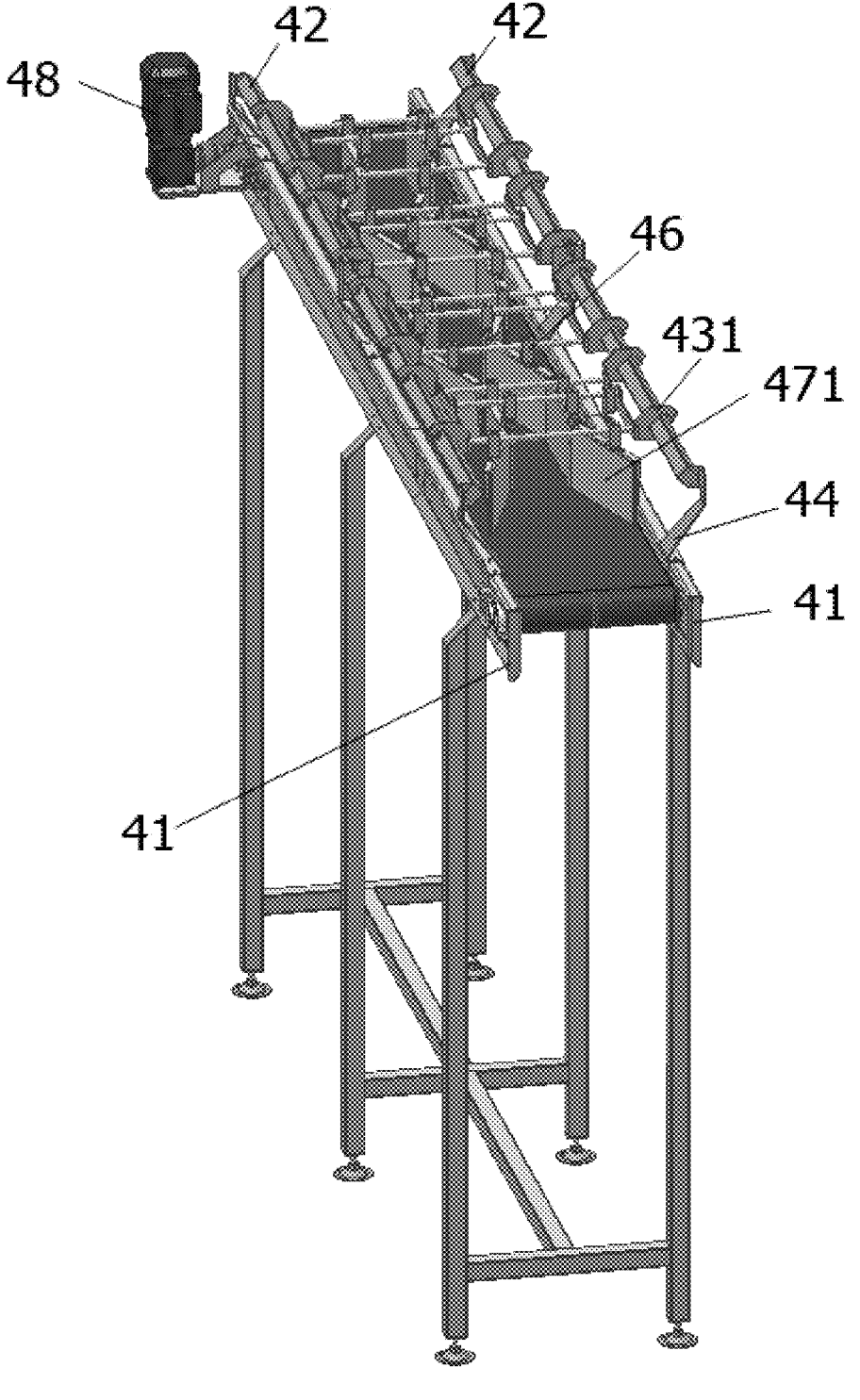
FIG. 9 depicts the front perspective view of the aligning belt.
Figure 10:
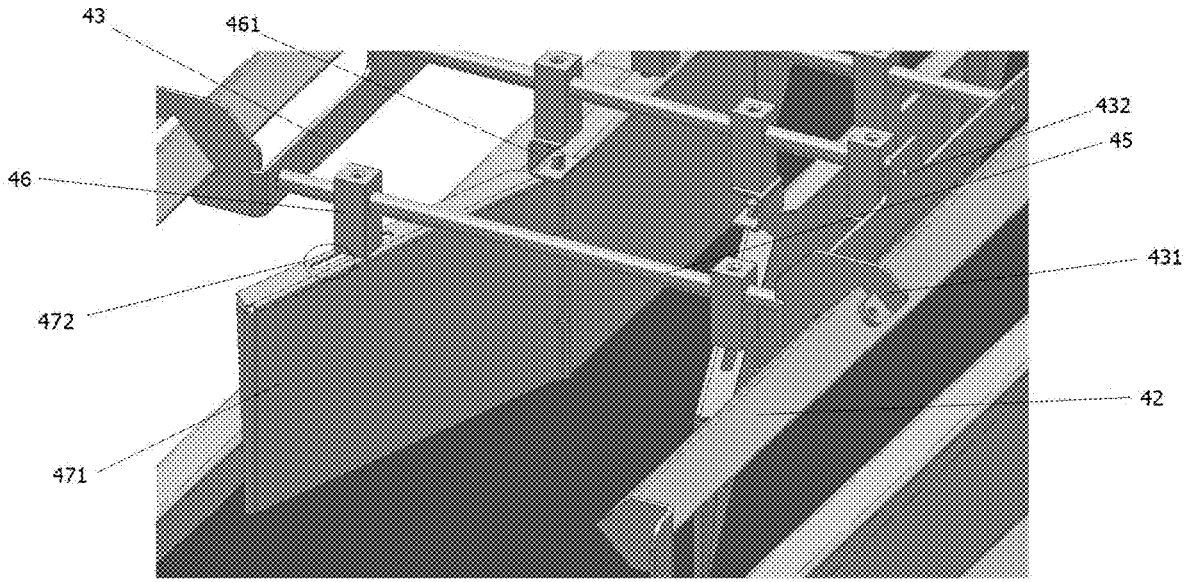
FIG. 10 depicts the front perspective view of the aligning belt with emphasis on the entrance of the poultry and the activation mode.
Figure 11:
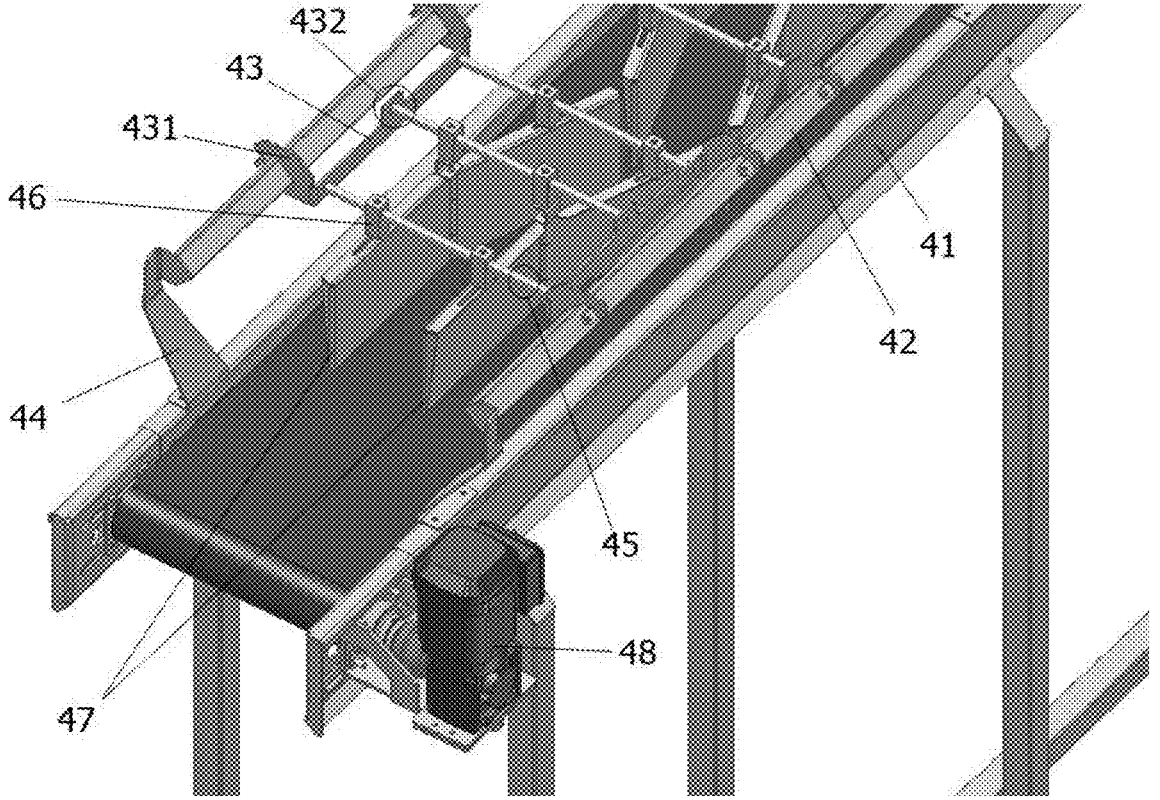
FIG. 11 depicts the rear perspective view of the aligning belt with emphasis on the exit of the poultry.
Figure 12:
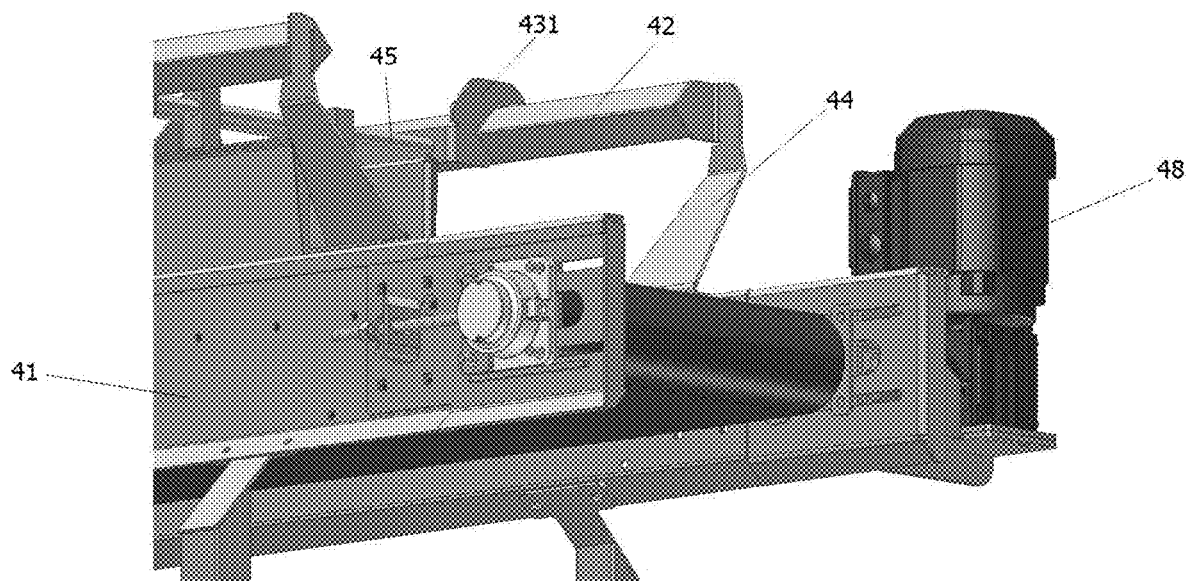
FIG. 12 depicts the rear perspective view of the aligning belt with emphasis on the activation mode.
Figure 13:
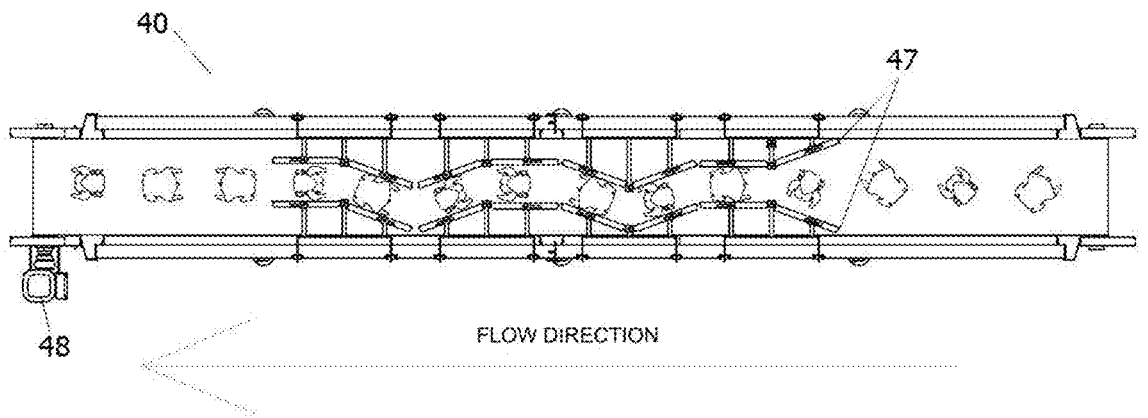
FIG. 13 depicts the top view of the aligning belt in operation.
Figure 14:
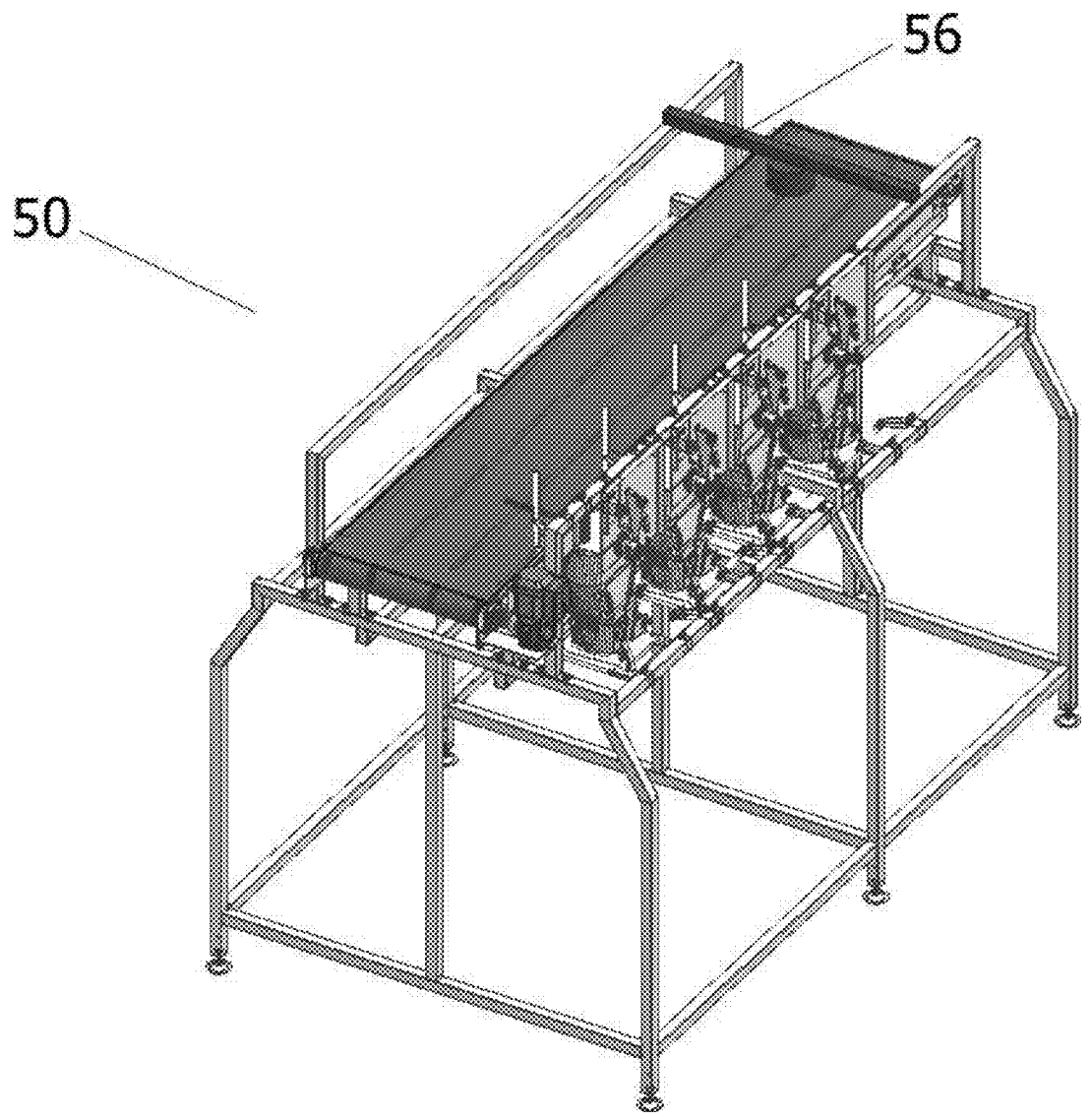
FIG. 14 depicts the rear perspective of the vertical positioner belt.
Figure 15:
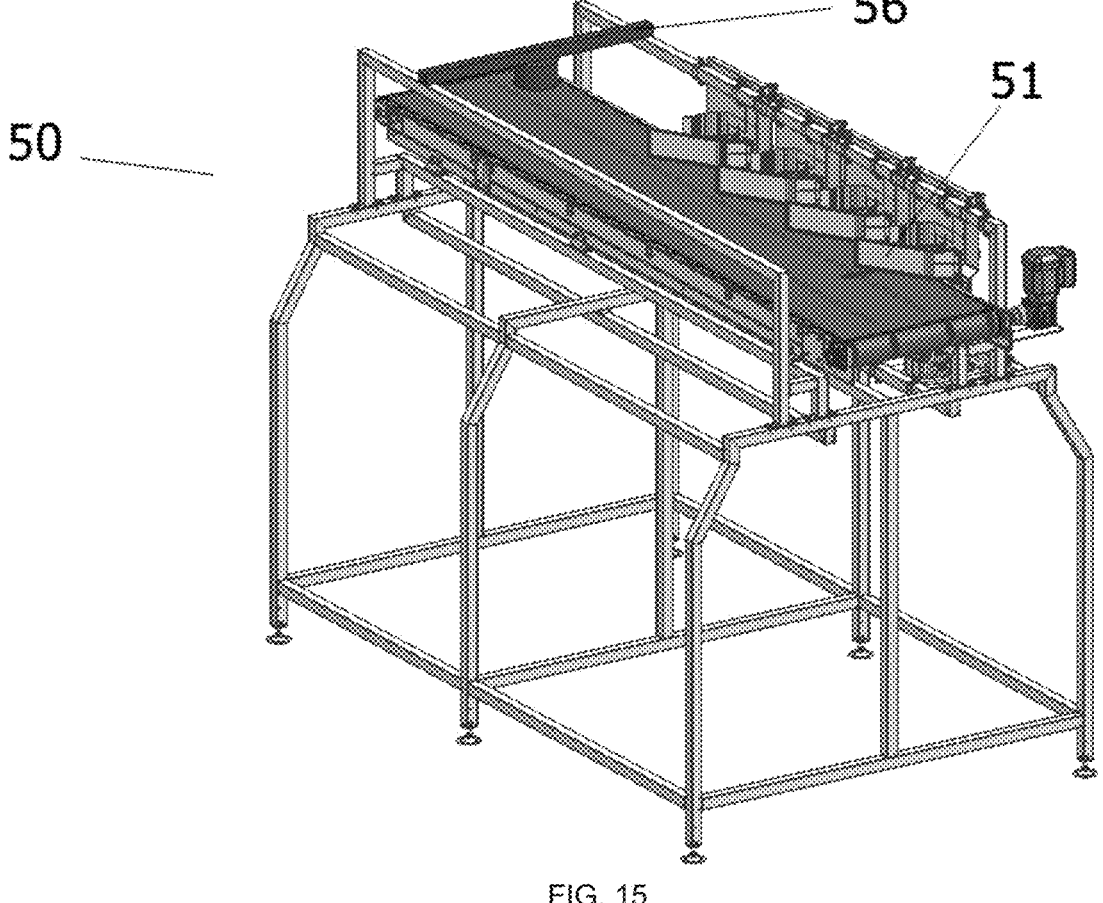
FIG. 15 depicts the rear perspective view of the vertical positioner belt.
Figure 16:
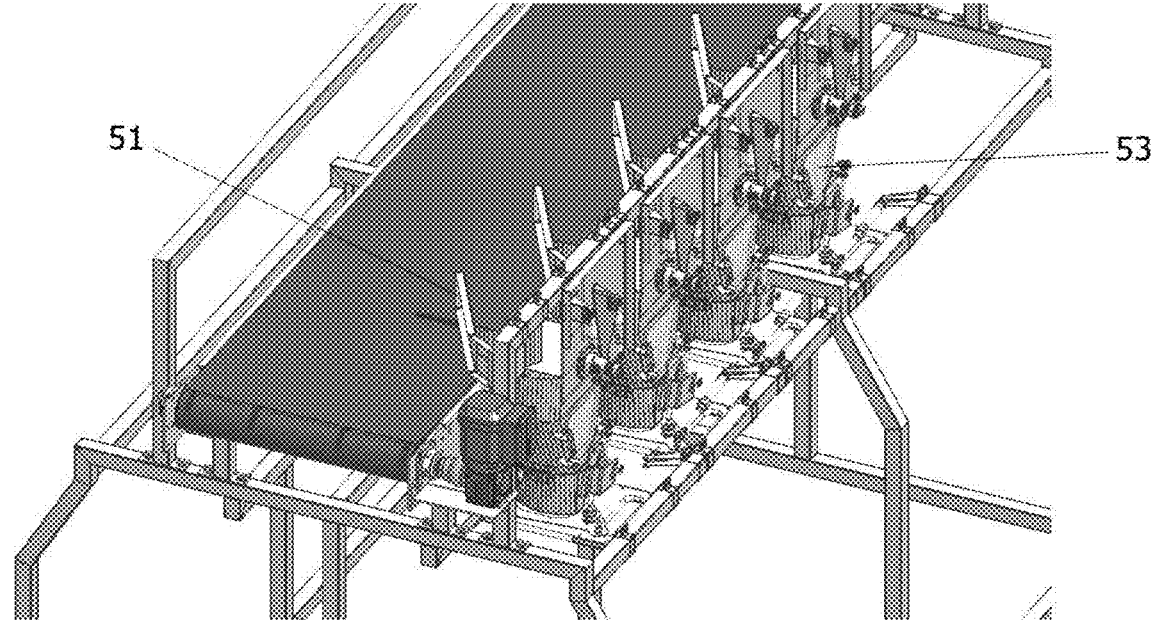
FIG. 16 depicts the rear perspective view of the vertical positioning belt with emphasis on the positioners.
Figure 17:
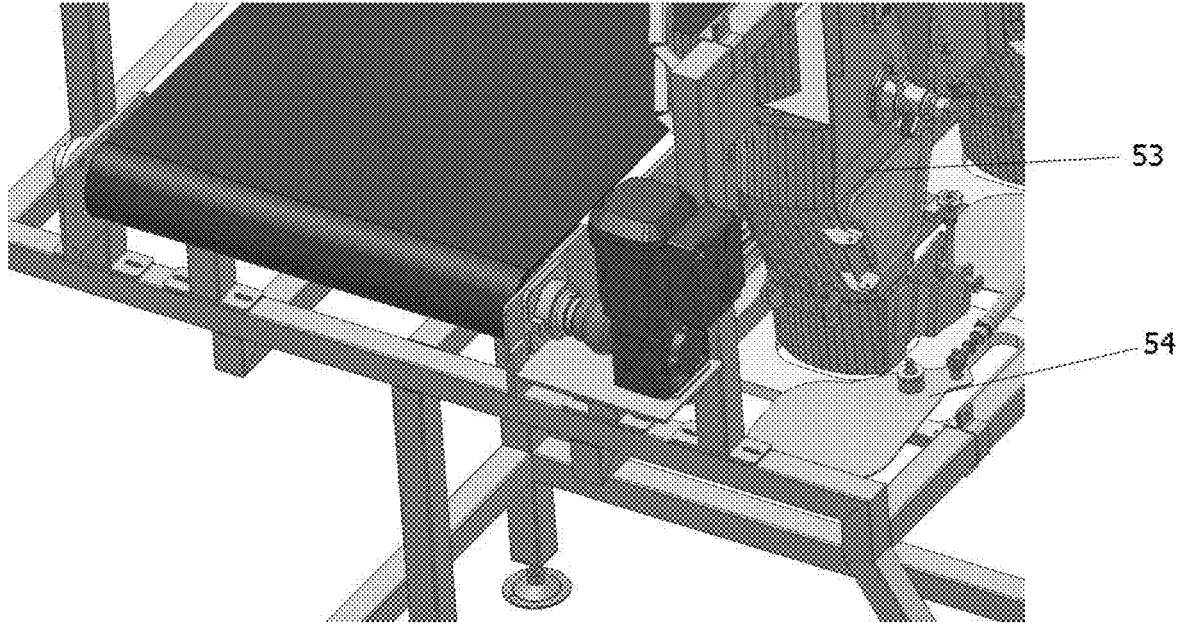
FIG. 17 depicts the rear perspective view of the vertical positioning belt in the exit with emphasis on the positioners and the activation mode.
Figure 18:
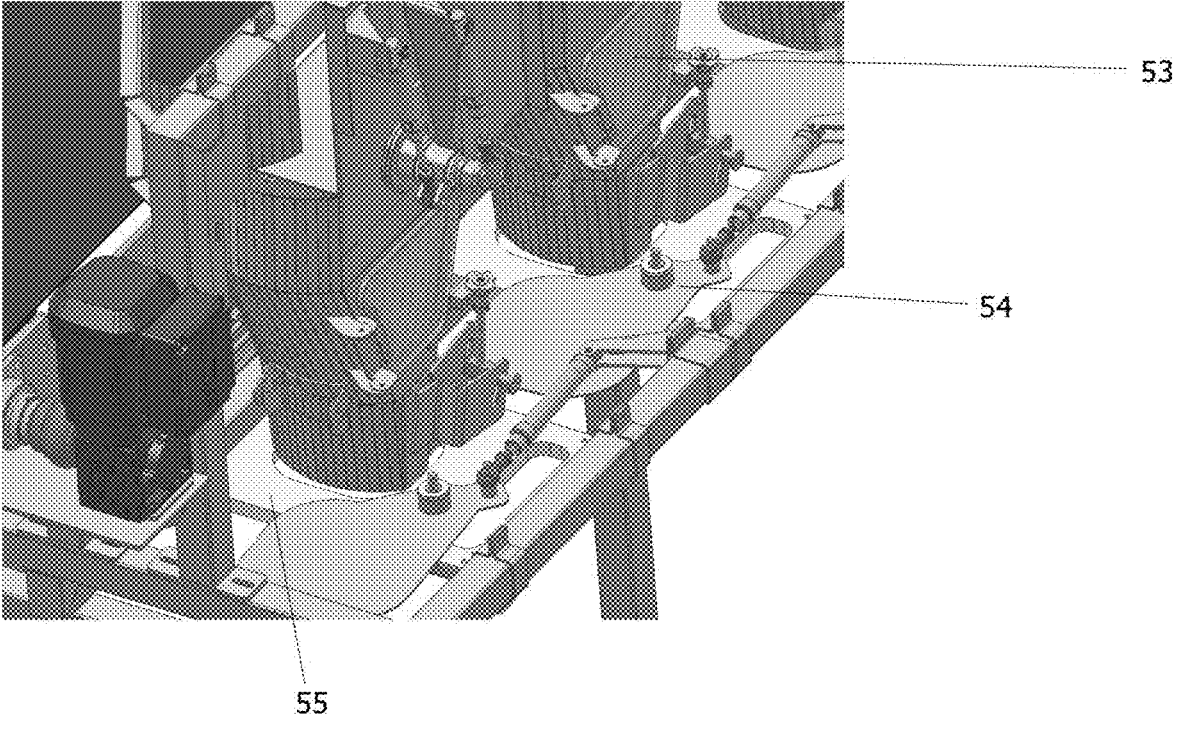
FIG. 18 depicts the rear perspective view of the vertical positioning belt with emphasis on the positioners and the activation mode.
Figure 19:
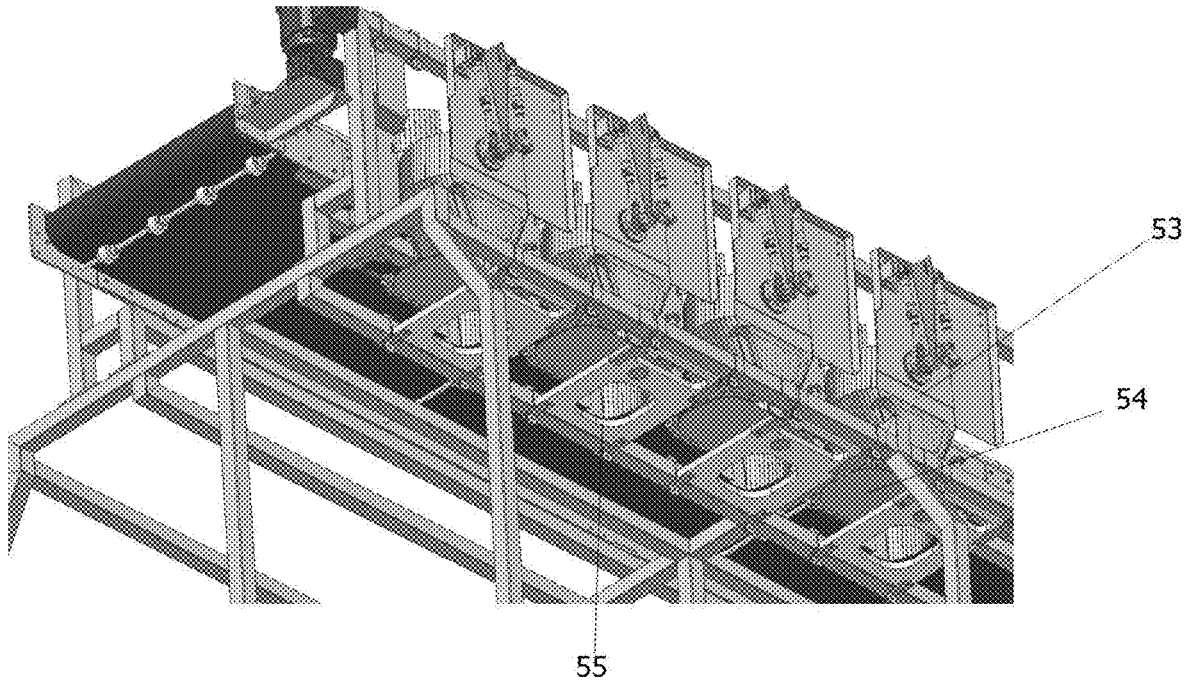
FIG. 19 depicts the bottom perspective view of the vertical positioner belt with emphasis on the positioners.
Figure 20:
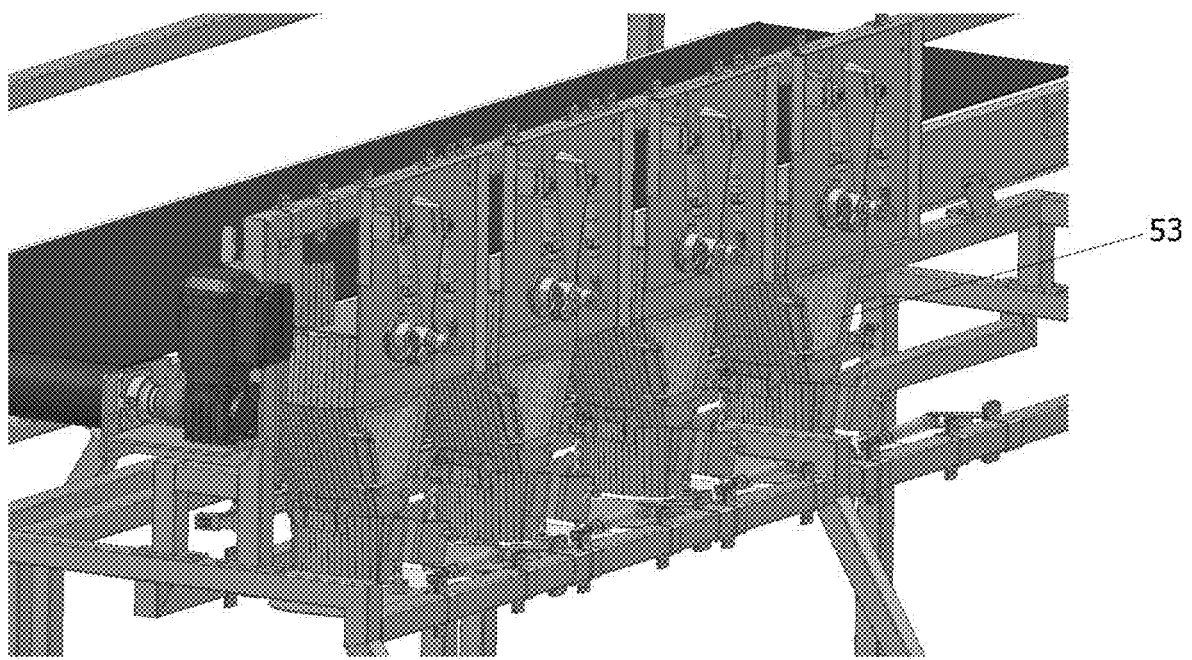
FIG. 20 depicts the rear perspective view of the vertical positioning belt with emphasis on the positioners.
Figure 21:
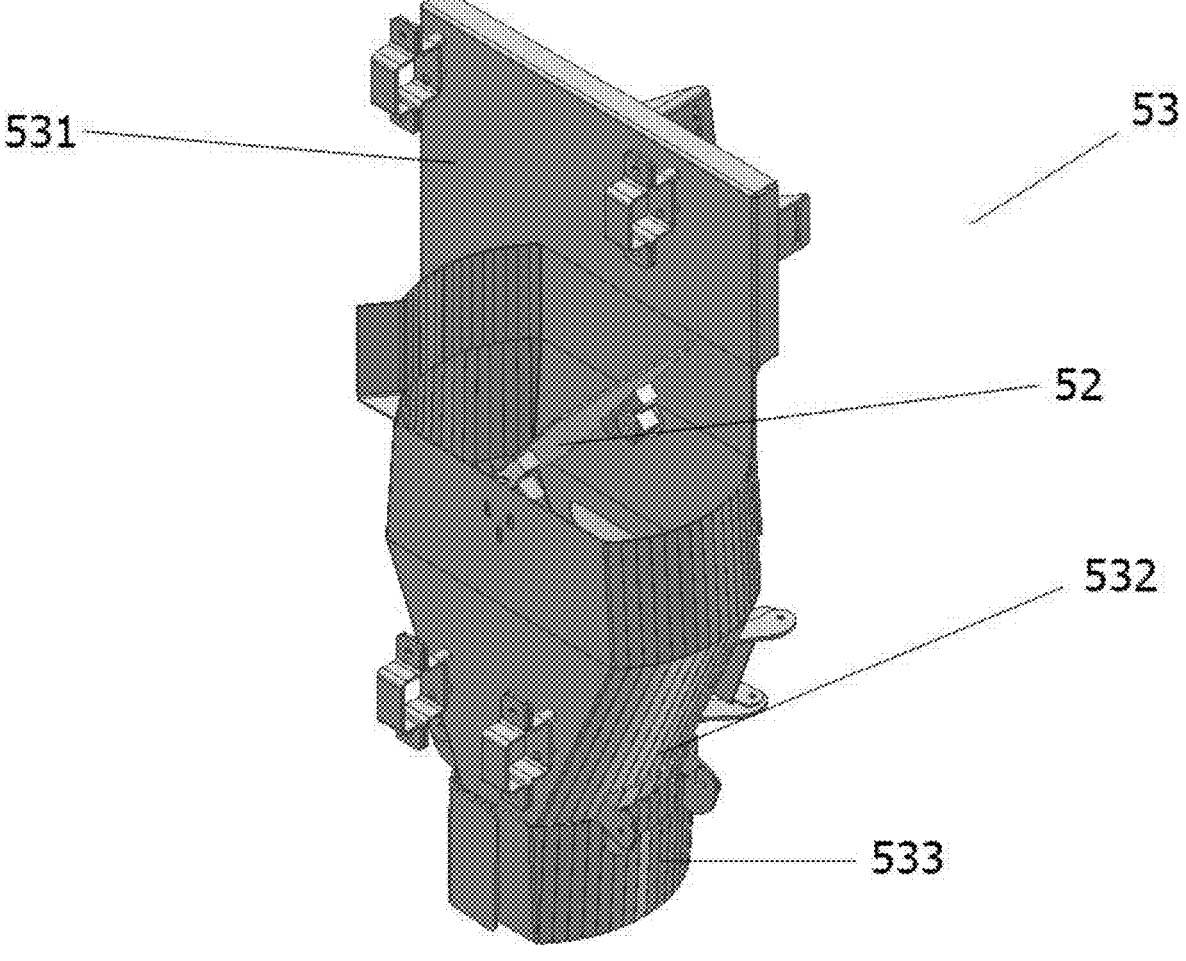
FIG. 21 depicts the front perspective view of the vertical positioner with the tilting board open.
Figure 22:
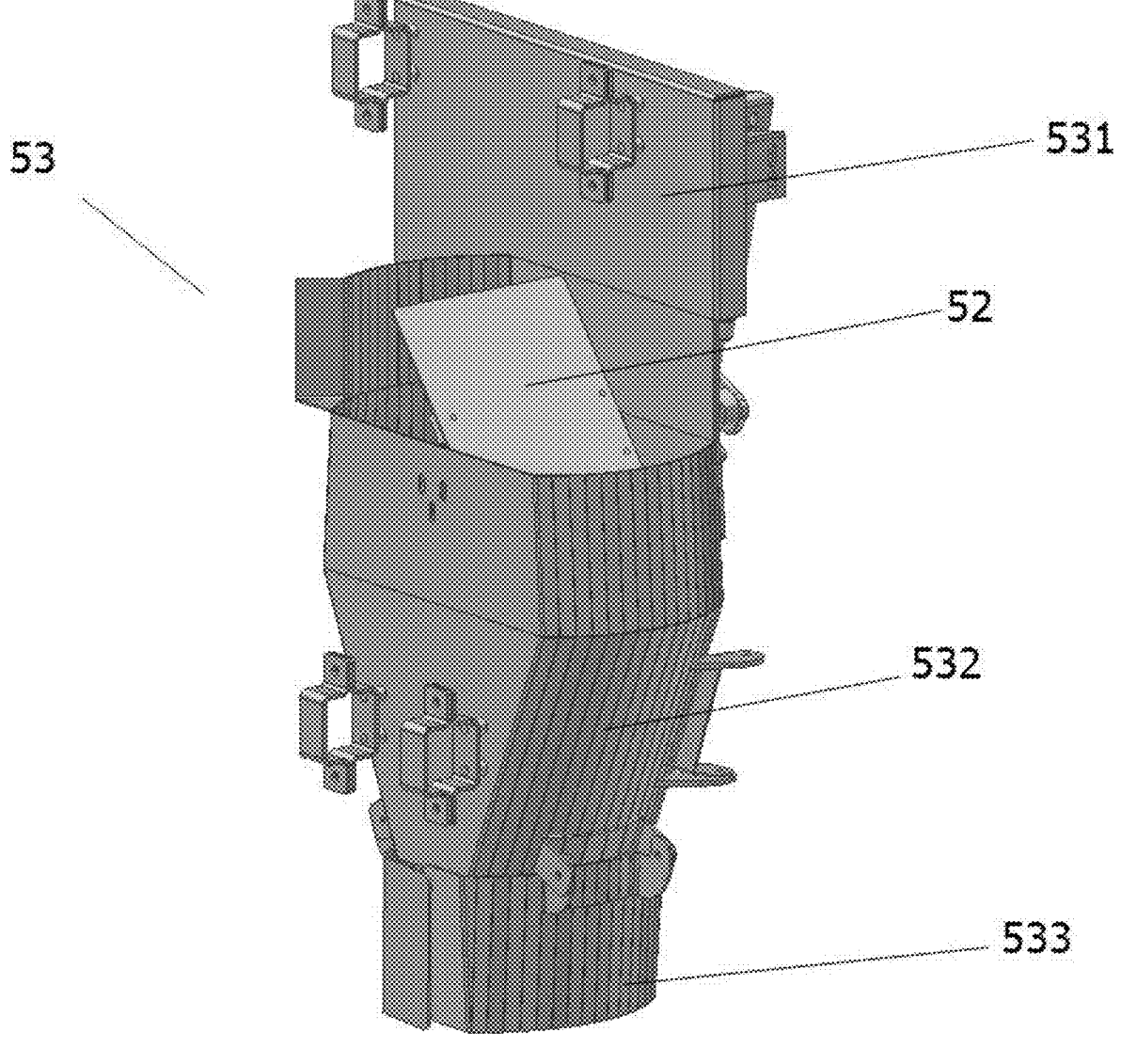
FIG. 22 depicts the front perspective view of the vertical positioner with the tilting board open.
Figure 23:
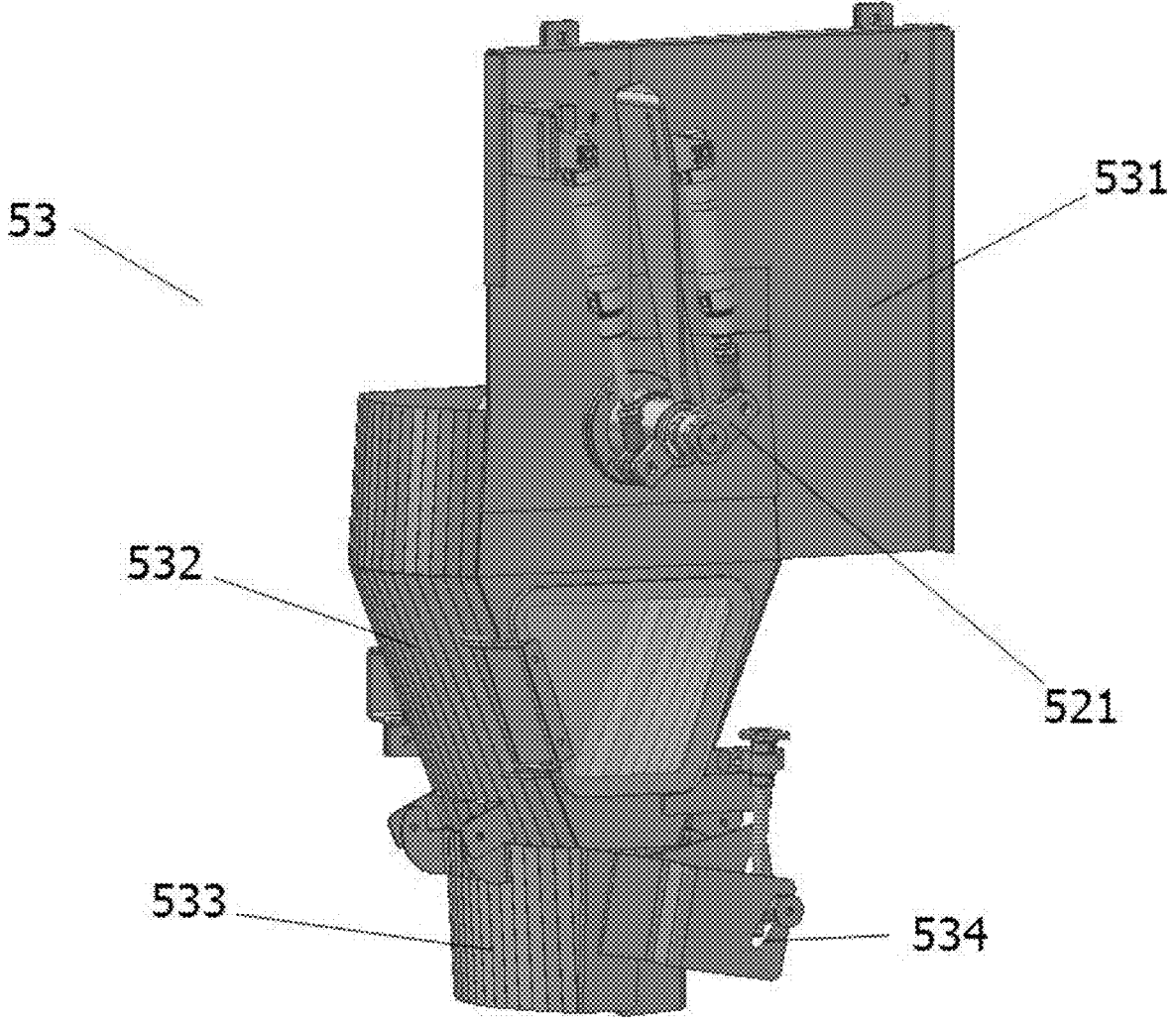
FIG. 23 depicts the rear perspective view of the vertical positioner with the tilting board open.
Figure 24:
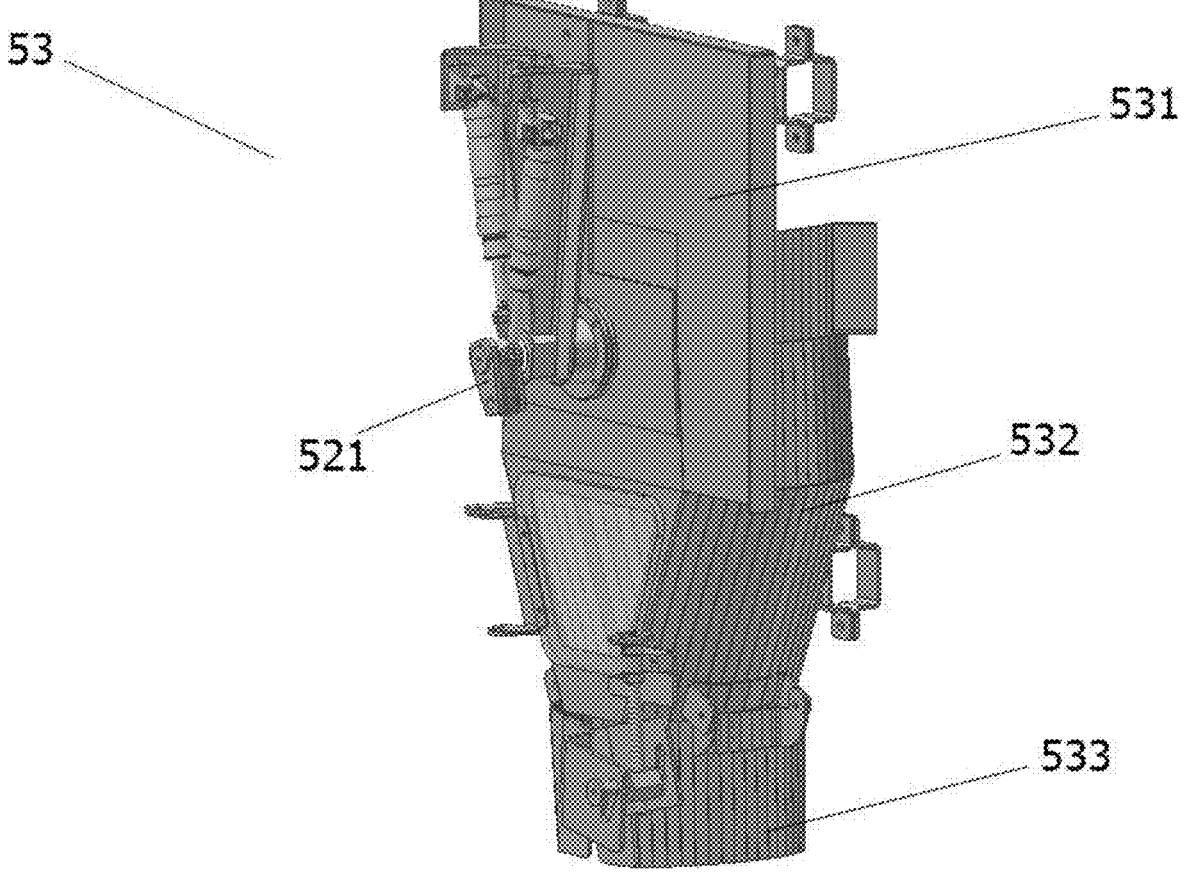
FIG. 24 depicts the rear perspective view of the vertical positioner with the tilting board open.
Figure 25:
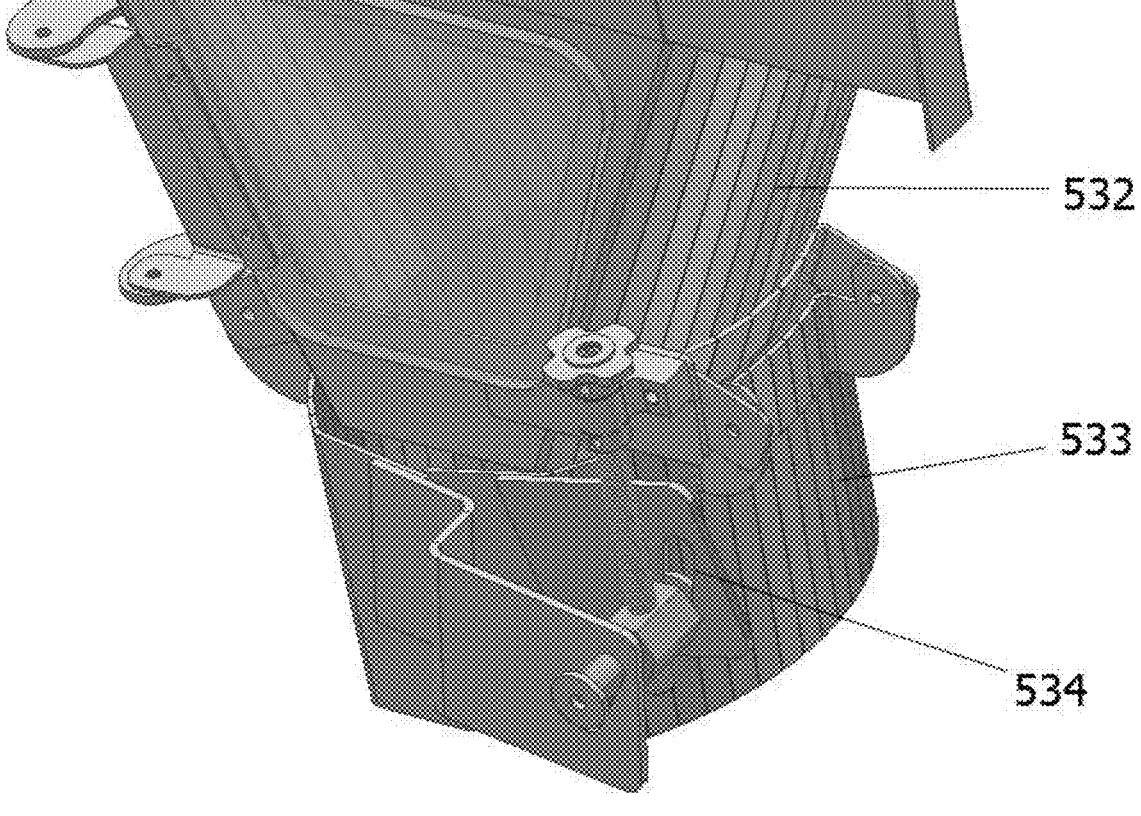
FIG. 25 depicts the rear perspective view of the vertical positioner with emphasis on the tapered body assembly and the outlet nozzle.
Figure 26:
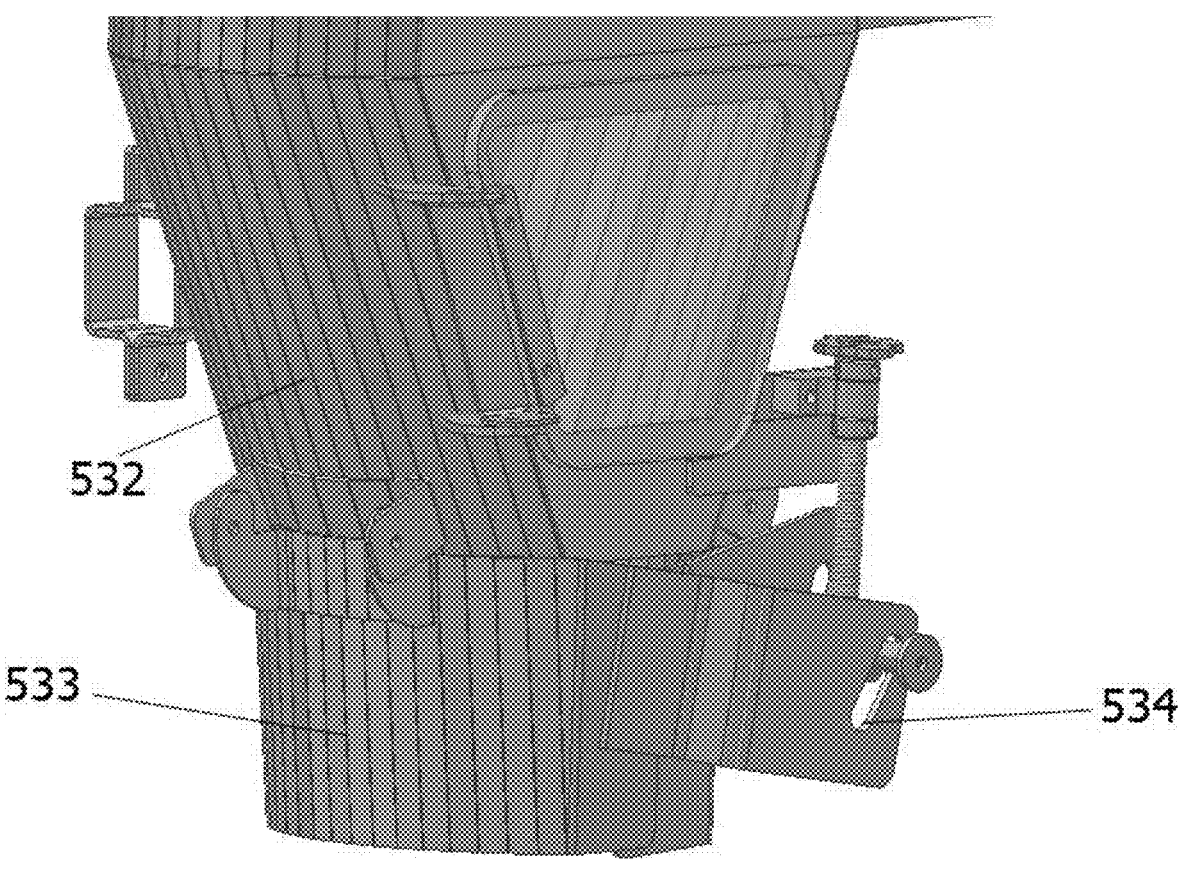
FIG. 26 depicts the rear perspective view of the vertical positioner with emphasis on the tapered body assembly and the outlet nozzle.
Figure 27:
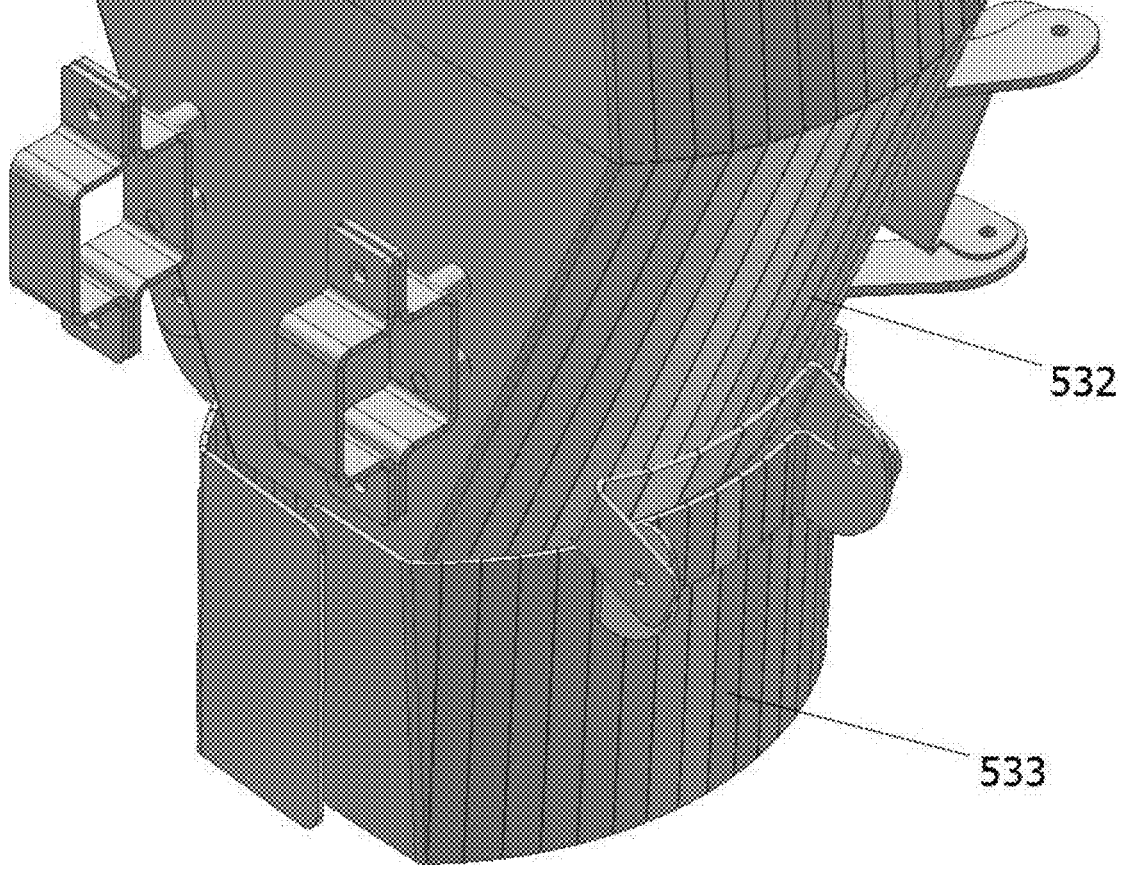
FIG. 27 depicts the front perspective view of the vertical positioner with emphasis on the tapered body assembly and the outlet nozzle.
Figure 28:
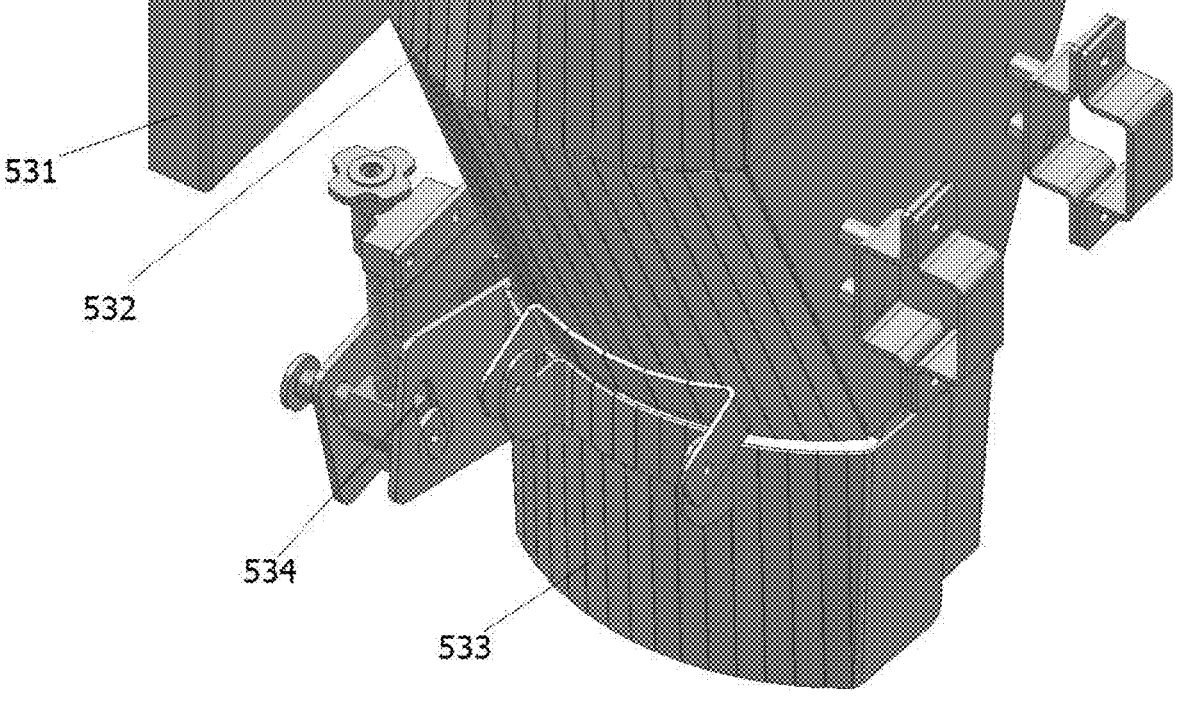
FIG. 28 depicts the front perspective view of the vertical positioner with emphasis on the tapered body assembly and the outlet nozzle.
Figure 29:
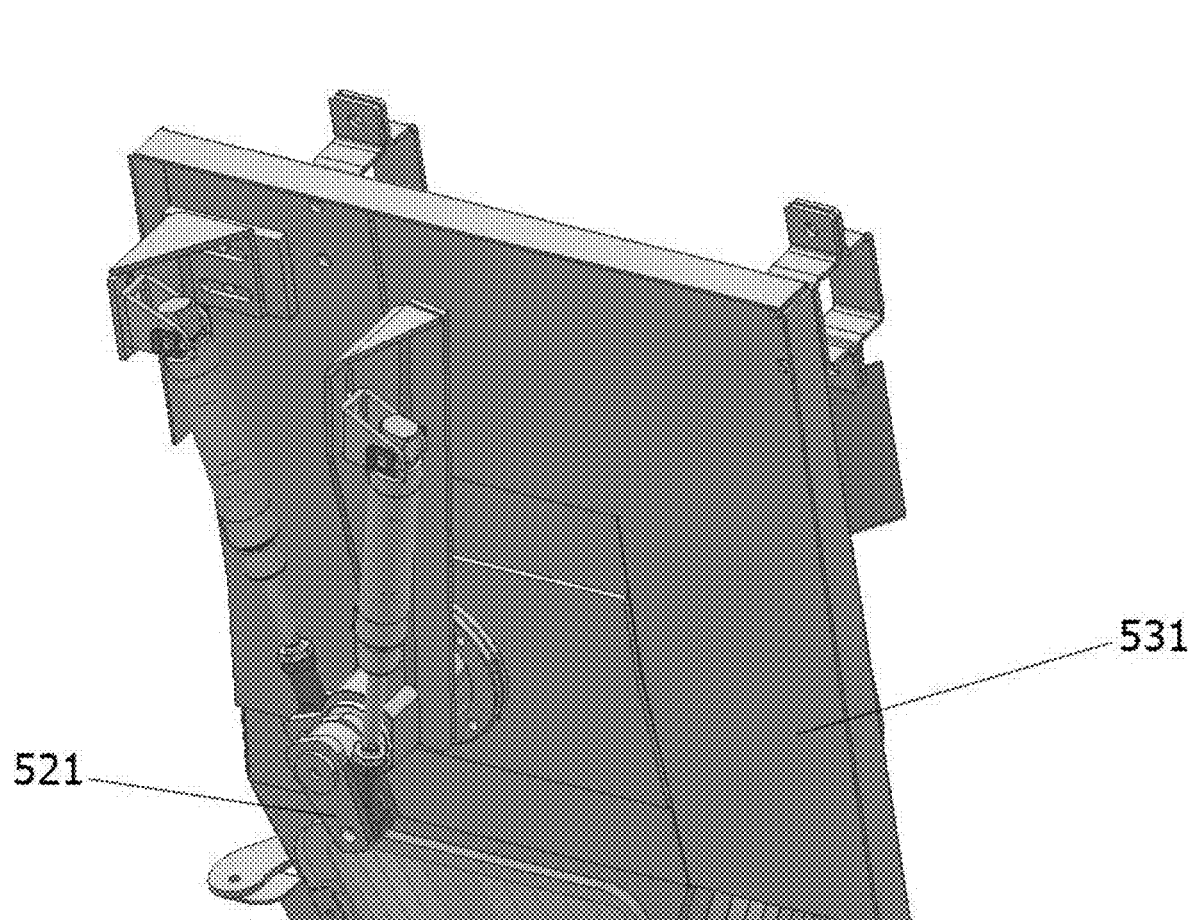
FIG. 29 depicts the rear perspective view of the vertical positioner with emphasis on the pneumatic system of the tilting board.
Figure 30:
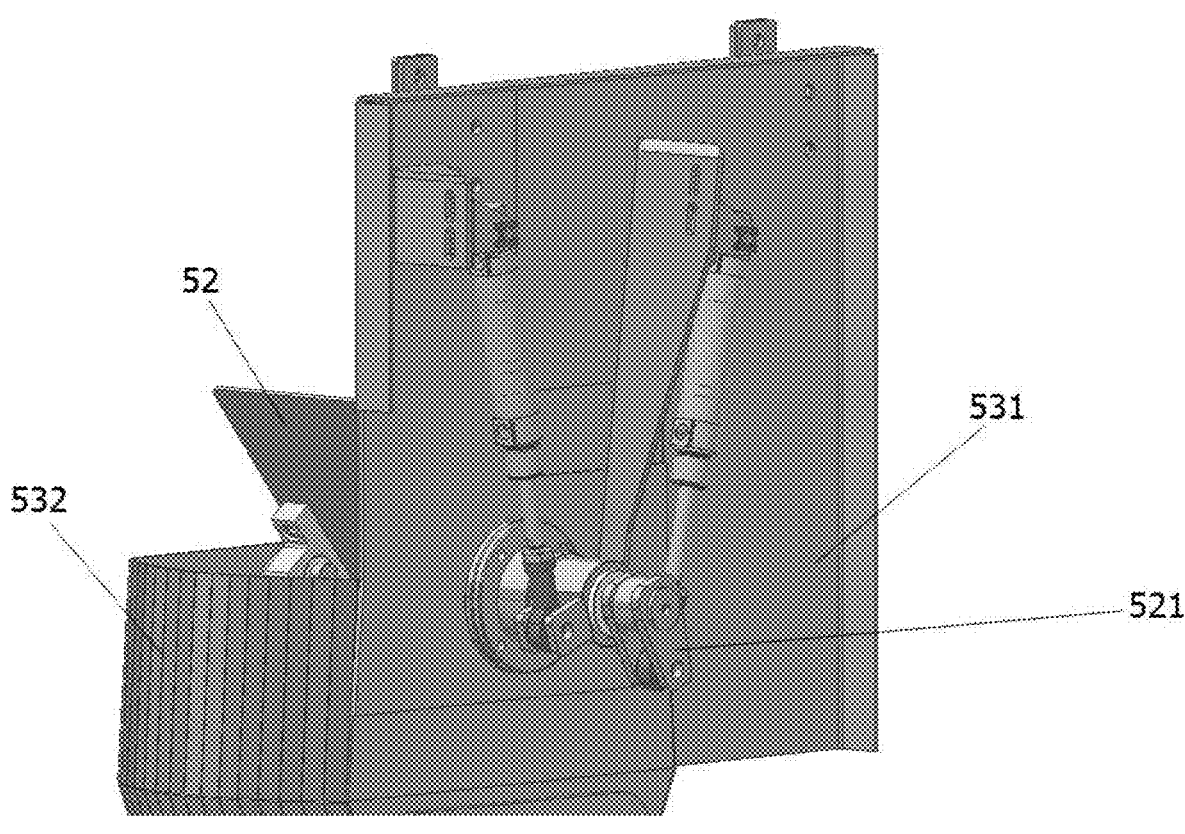
FIG. 30 depicts the rear perspective view of the vertical positioner with emphasis on the pneumatic system with the tilting board open.
Figure 31:
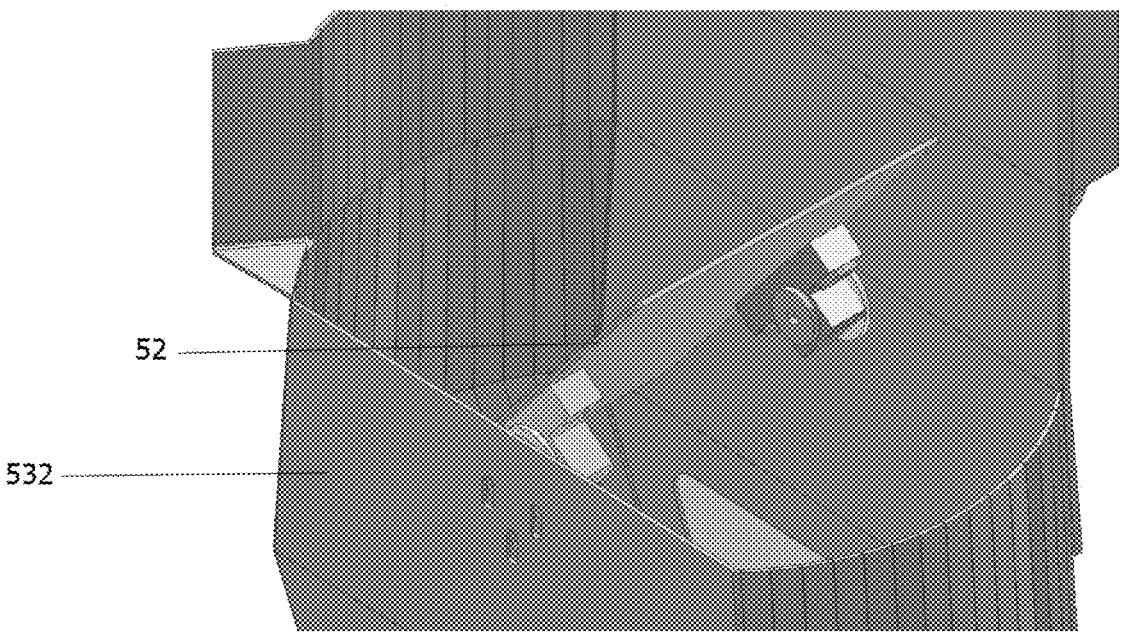
FIG. 31 depicts the front perspective view of the vertical positioner highlighting the open tilting board.
Figure 32:
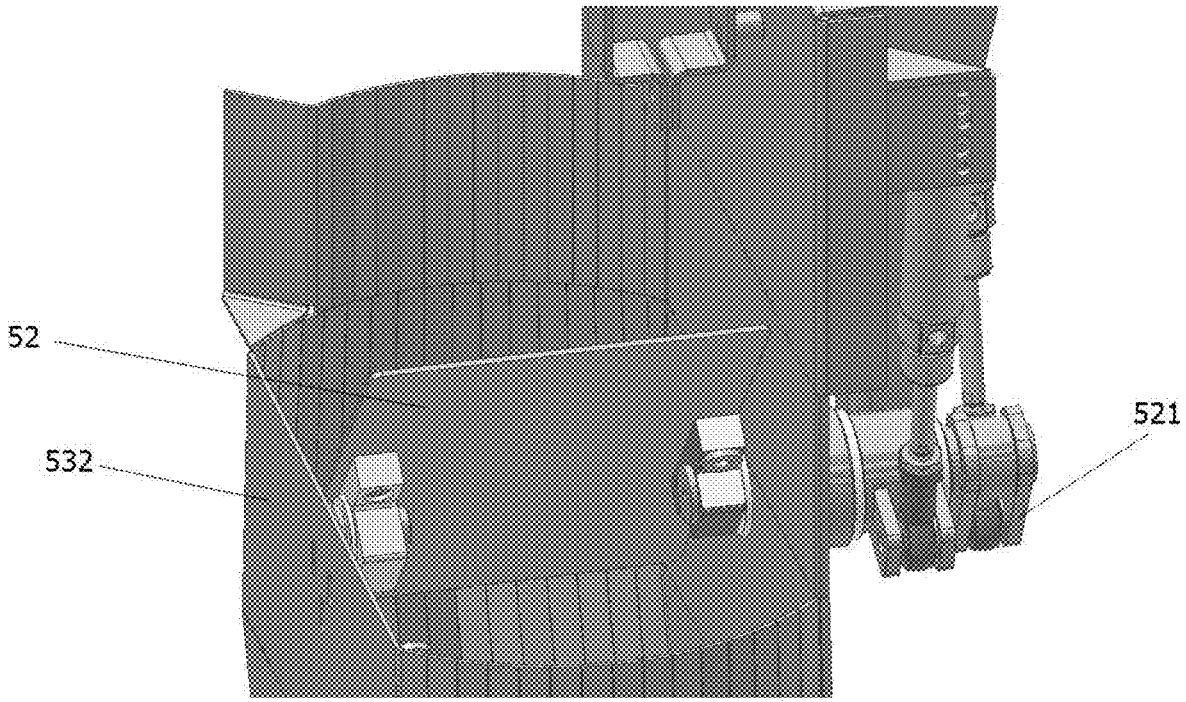
FIG. 32 depicts the front perspective view of the vertical positioner highlighting the open tilting board.
Figure 33:
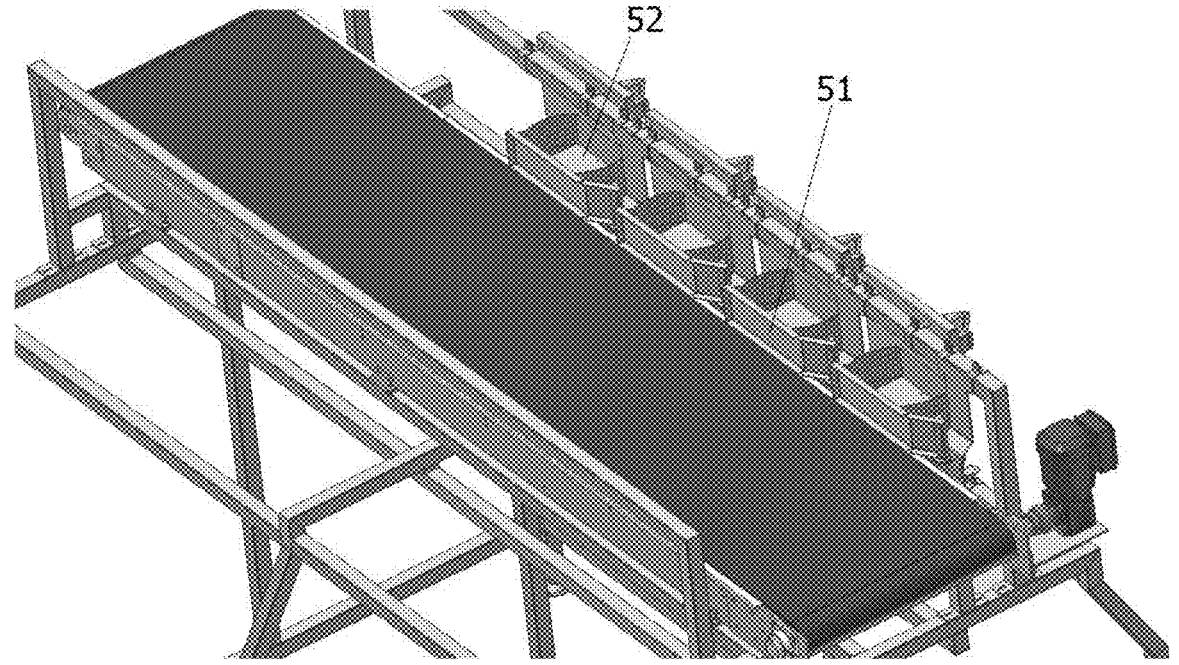
FIG. 33 depicts the rear perspective view of the vertical positioning belt with emphasis on the closed vanes.
Figure 34:
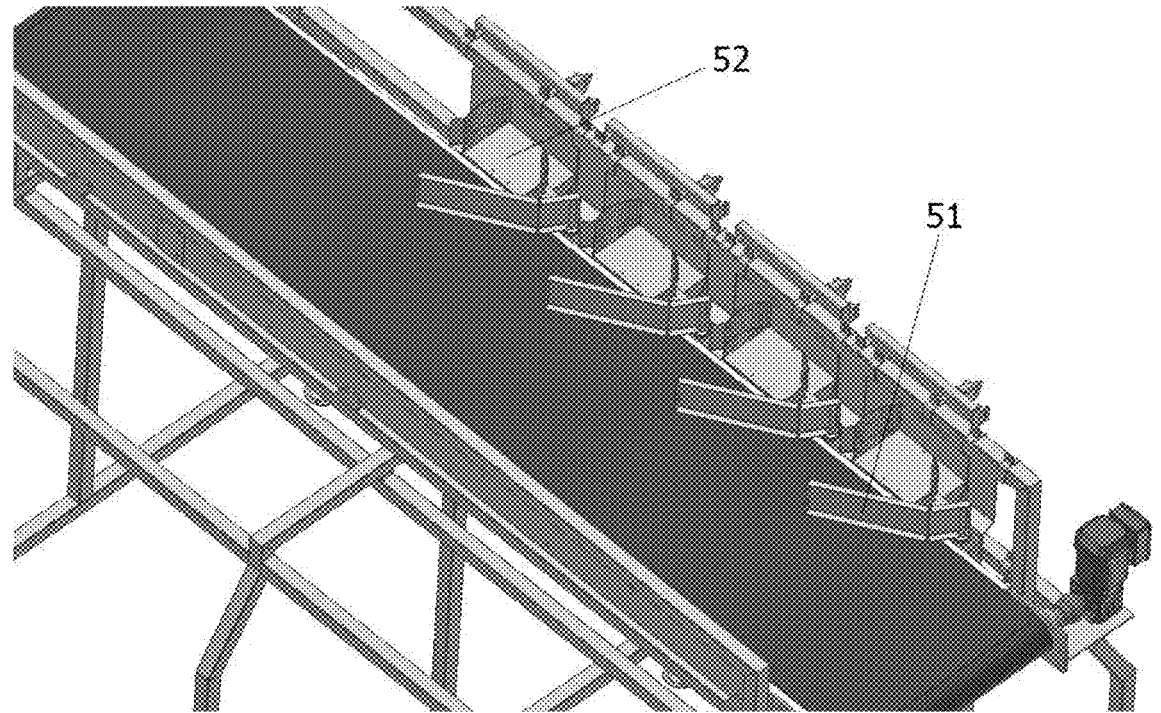
FIG. 34 depicts the rear perspective view of the vertical positioning belt with emphasis on the open vanes.
Figure 35:
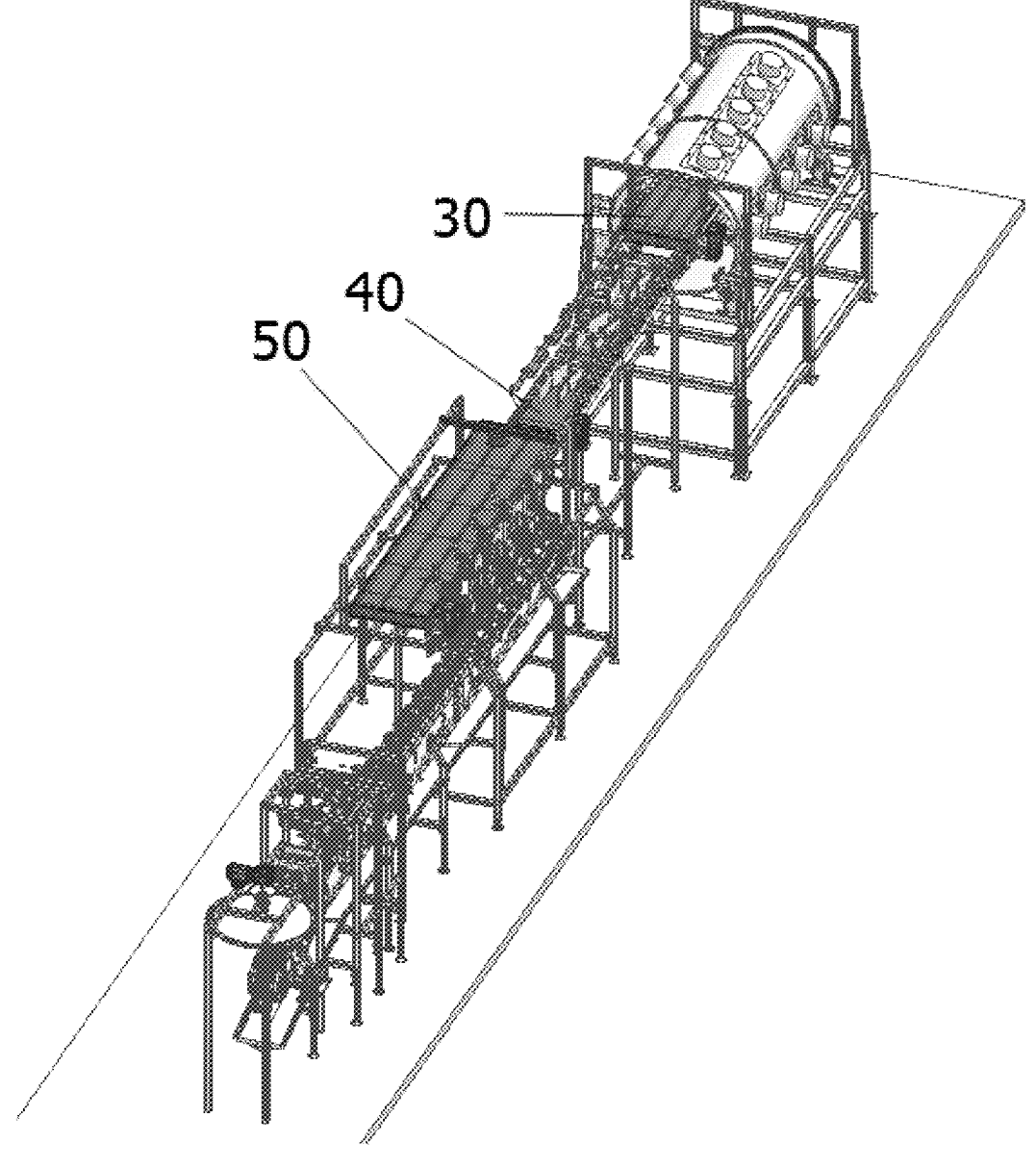
FIG. 35 depicts the rear perspective view of the equipment installed in the production line.
Figure 36:
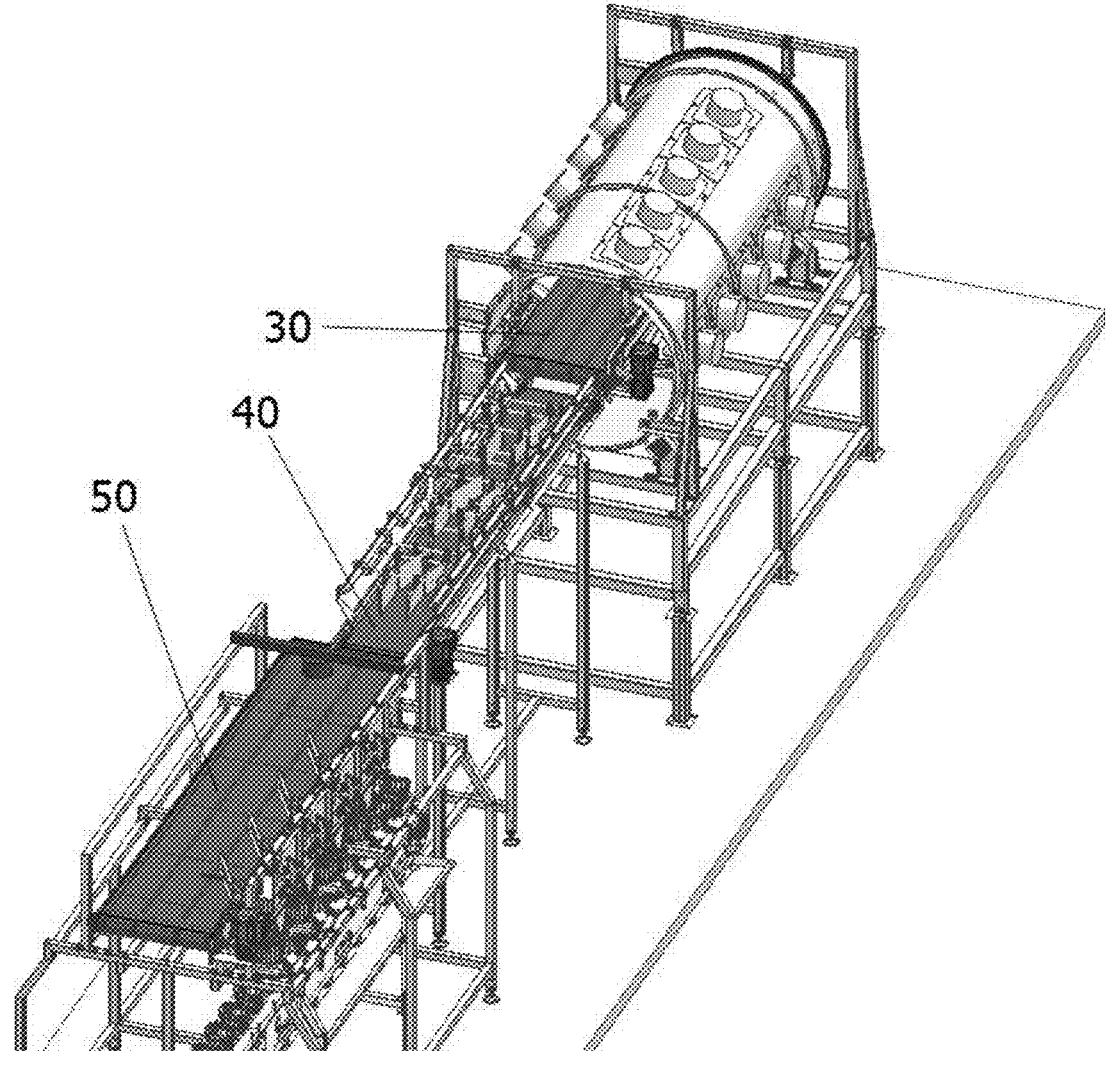
FIG. 36 depicts the rear perspective view of the production line with emphasis on the poultry separation equipment.
Figure 37:
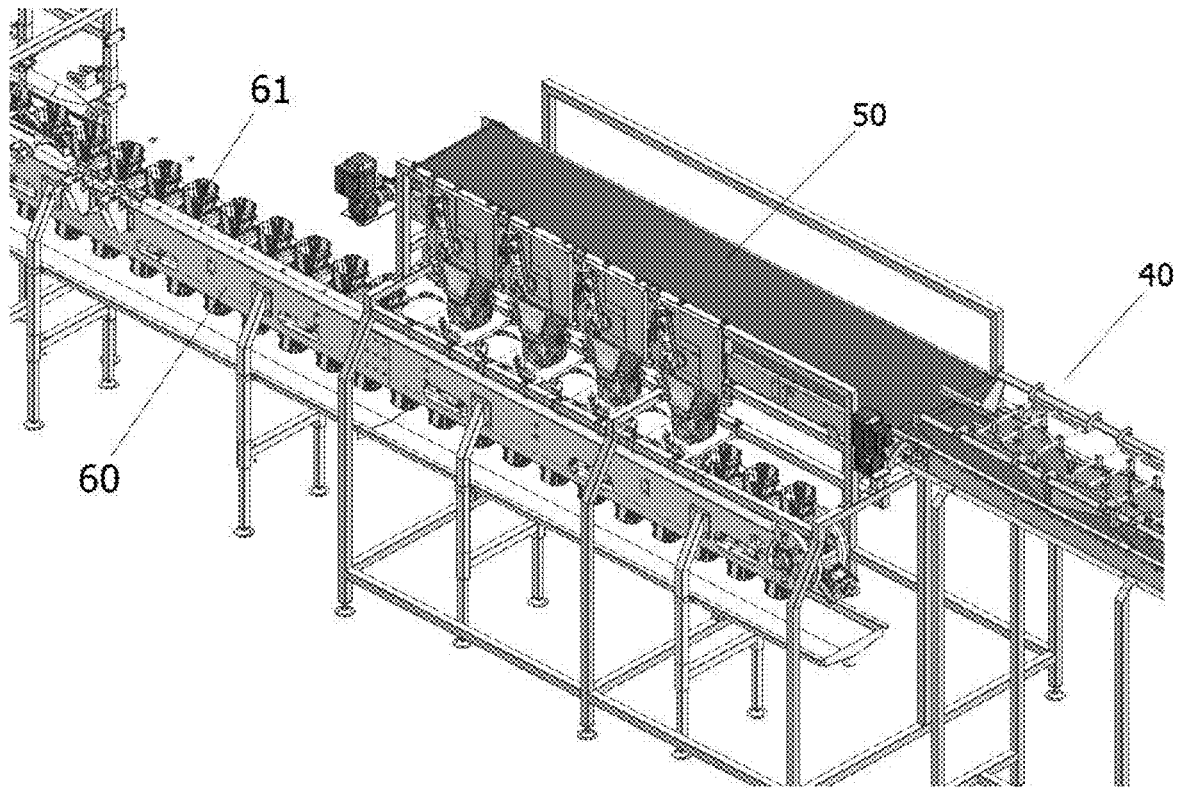
FIG. 37 depicts the rear perspective view of the production line with emphasis on the vertical positioning belt.
Figure 38:
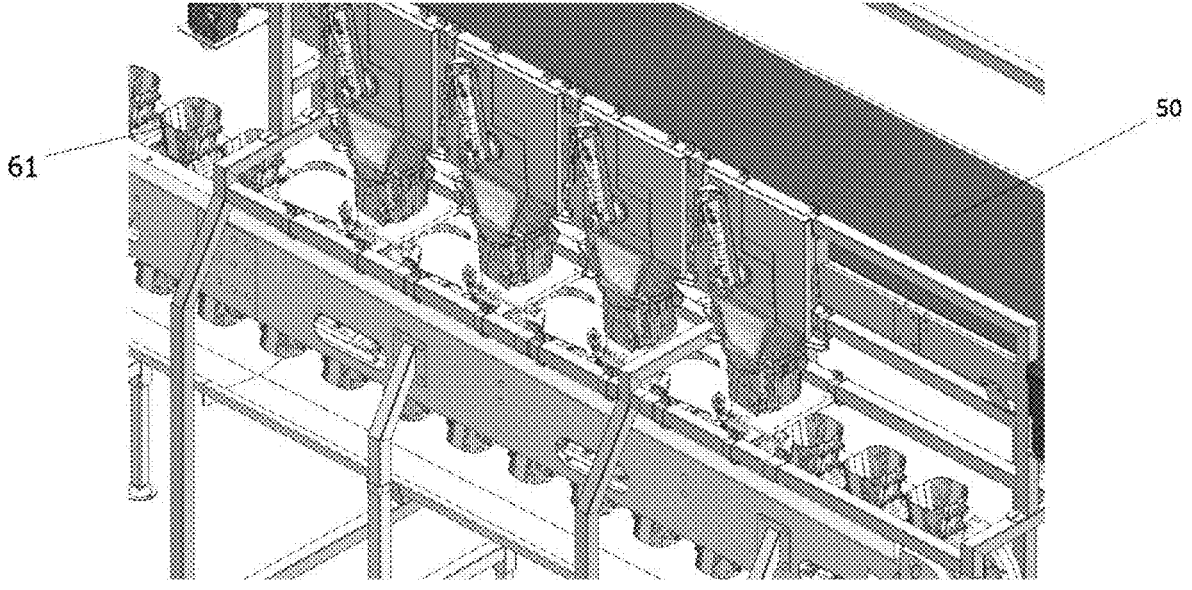
FIG. 38 depicts the rear perspective view of the production line with emphasis on the positioners.
Figure 39:
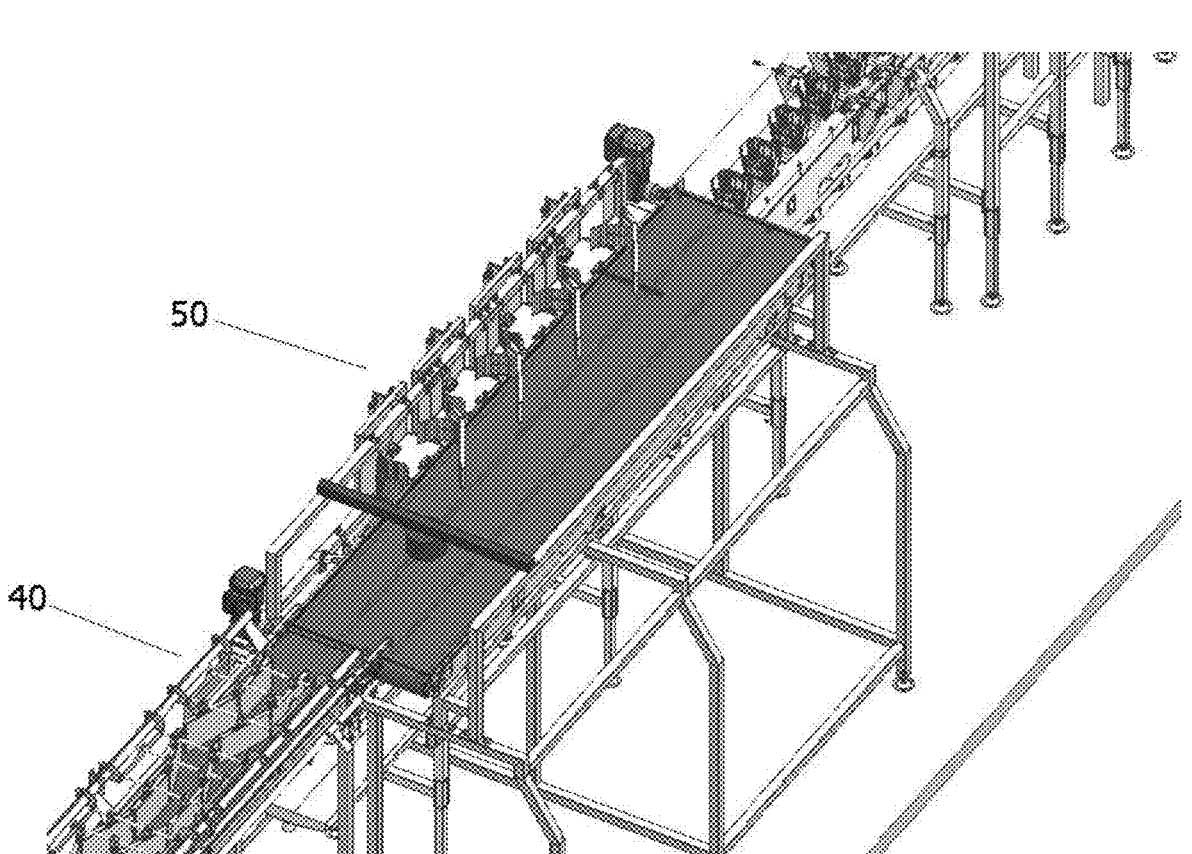
FIG. 39 depicts the rear perspective view of the production line with emphasis on the vertical positioning belt.
Figure 40:
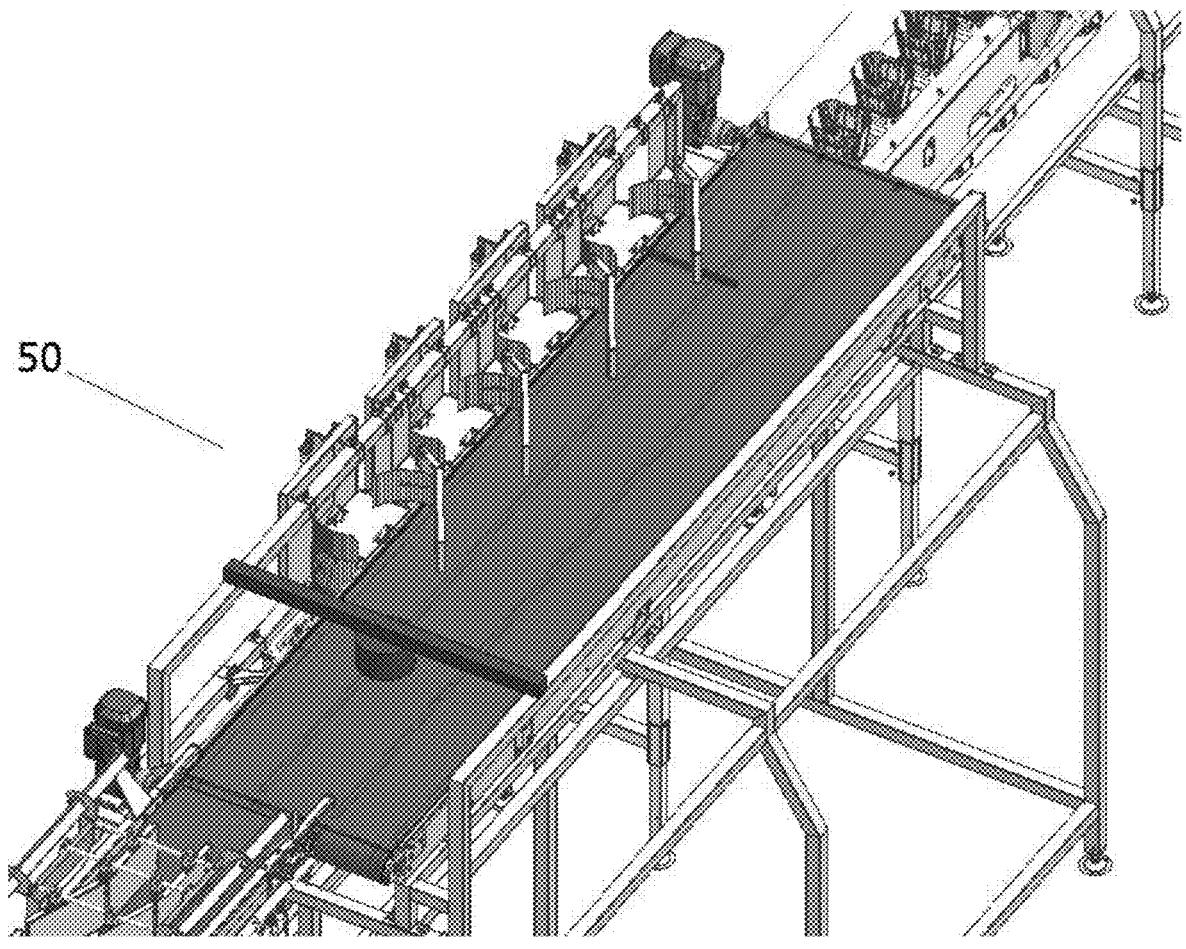
FIG. 40 depicts the rear perspective view of the production line with emphasis on the vertical positioning belt.
Figure 41:
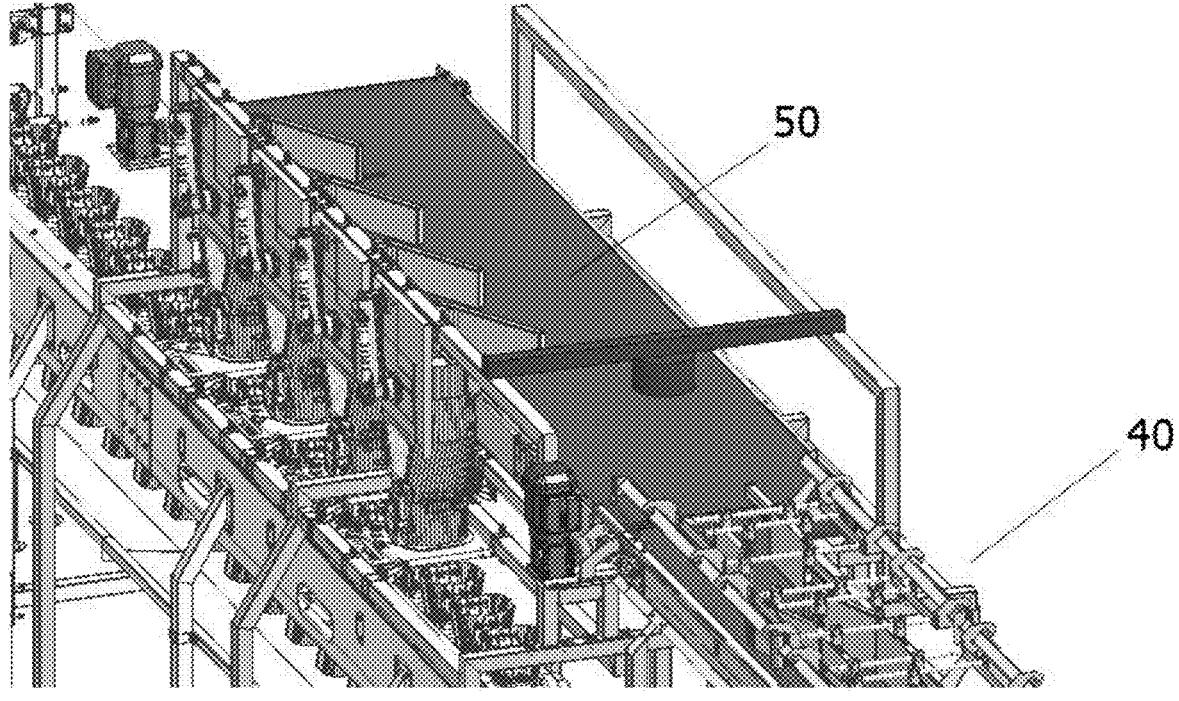
FIG. 41 represents the rear perspective view of the production line with emphasis on the exit of the aligning belt and the start of the vertical positioning conveyor.
Figure 42:
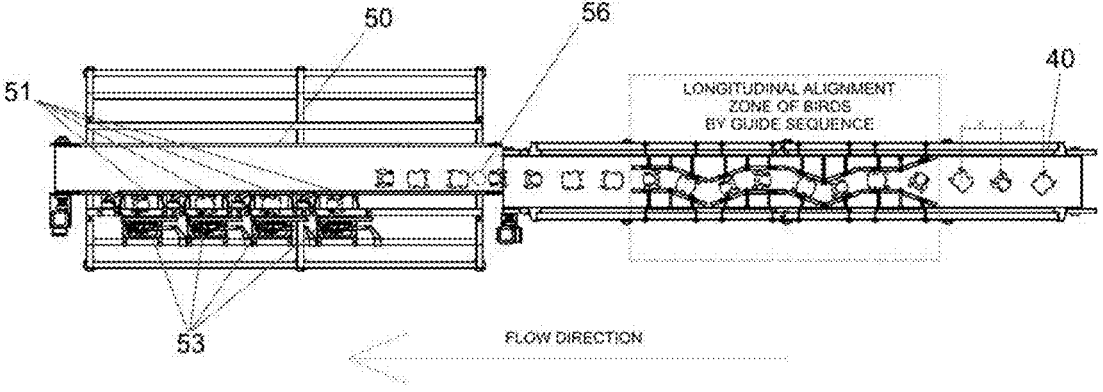
FIG. 42 represents the top view of the poultry positioner with emphasis on the poultry being directed to the positioners.

According to FIG. 1, it represents the equipment that includes the collecting conveyor (30), supported by a metal structure, whose function is to receive the already slaughtered and weighed poultry from a previous step, being separated by spaces (X) between 300 to 500 mm, but preferably in 400 mm from center to center, according to FIG. 42. The poultry may be in a random position on its central axis, with its breast or back resting on the conveyor belt (30). There is a blocking element (32) juxtaposed to the conveyor belt (30), which helps the poultry placed on the conveyor belt (30) in a previous process to settle on the surface and remain organized and harmonized. The conveyor belt (30) is also equipped with hangers (31), connected by fasteners, which can be installed on production lines and has a gearmotor drive (33).

Adjoining the collecting conveyor belt (30), there is the aligning belt (40), supported by a metal structure, with the function of guiding the weighed poultry to pass through a guide (47) previously configured so that the longitudinal axis of the animal coincides with the longitudinal direction of the conveyor belt (40); in any case, brief modifications may be made, for example, by adding to the conveyor belt (40) two or more guides (47) according to their dimensions. The aligning belt (40) comprises metal sheets (41) attached to the support bars (42) arranged longitudinally by support elements (44). The bars (42) assist in supporting the pieces (43) that are juxtaposed by jaw clamps (431) and are provided with holes (432). The crossbars (45) receive fasteners (46) and are connected to the holes (43), and have the function of forming the sinuous guide (47) that has a sharp opening at the entrance of the conveyor belt (40), and a rectilinear outlet, to direct the poultry. For this, the guide (47) comprises flat plates (471) equipped with slots (472) in its upper region and models with lateral hooks and loops, which together form a hinge, with the aid of fasteners and connectors (461), which are accessory parts of the fasteners (46). The sinuous guide (47) may have the flat plates (471), which are positioned at an angle of 15 to 75° degrees, according to the operator's needs. The alignment belt (40) has the same gearmotor activation mode (48), with a system that is already widespread.

Above all, the jaw clamps (431) are coupled to the support bars (42) by fasteners such as screws, as well as the suggestion to join the fasteners (46) to the slots (472), using screws and nuts. In any case, the use of other mechanical elements is not restricted, where the technician would be able to choose the best arrangement with brief modifications to the work routine.

Adjoining the aligning belt (40), there is the vertical positioning conveyor (50), supported by a metal structure and operating at a rated speed of 40 m/min, with the function of guiding the sorted poultry to the collector vanes (51) leading them to the positioners (53), allowing them to be arranged in containers (61). The conveyor belt (50) has flat plates attached to the sides of the structure by joining elements, (531) fixed to the vertical positioners (53) and supports them by projecting their openings perpendicular to the conveyor belt (50). The positioners (53) are equipped with collector vanes (51) juxtaposed to movable semicircular walls, which move when they are opened; facing these walls, there are fixed walls of the same shape. They have a tapered body (532) juxtaposed to an outlet nozzle (533) by interlocking members, this nozzle (533) is fitted with a clip attached by fasteners inserted into slots (534) and joined, by a component fitted with a cavity, to an oblique element with a thread, which helps to close the access door to the positioner (53). In the space formed by the fixed wall, the movable wall and the vane (51), in each positioner (53), there is a tilting board (52) connected to a pneumatic system (521) that is coupled to the flat plate (531).

In line with the metal structure there is a tilting pneumatic mechanism (54), which moves the opening and keeps it closed in the lower region of the positioner (53), more precisely above the base (55) fixed to the structure by joining elements and equipped with a circular cavity which allows the poultry to be released into the containers (61).

Figure 46:
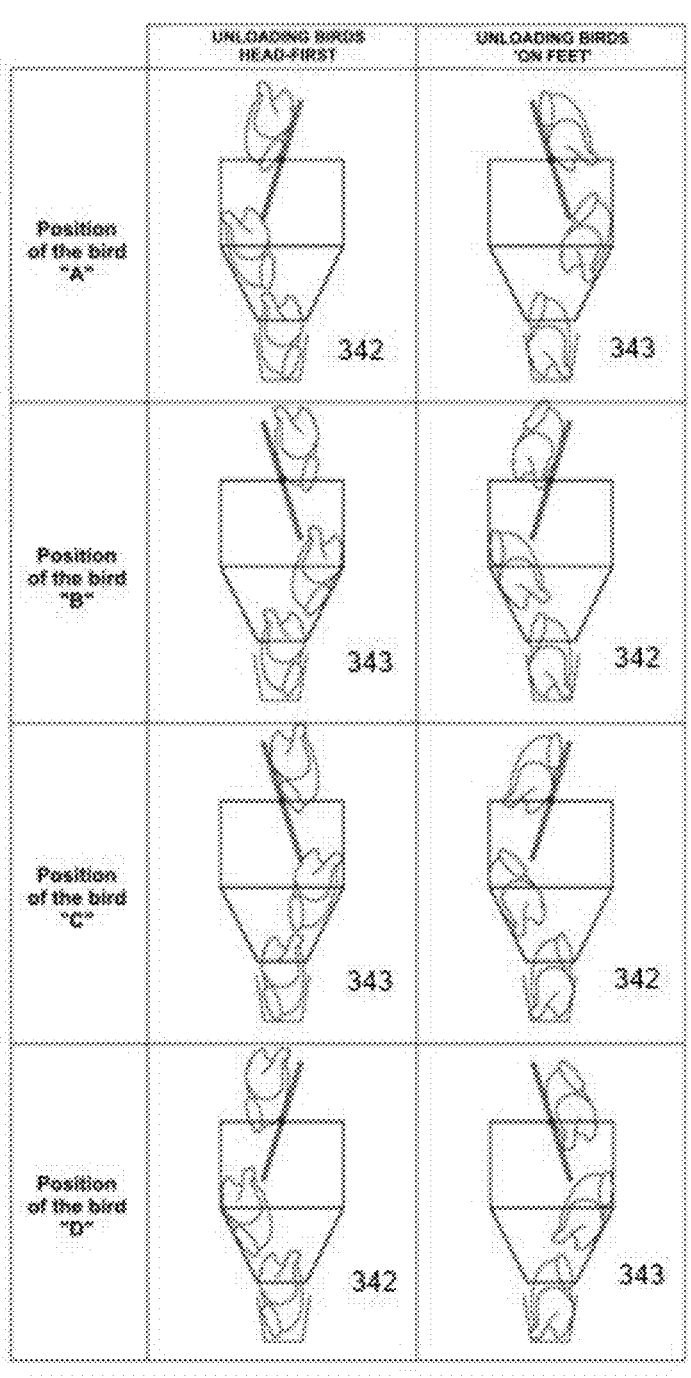
FIG. 46 depicts the front view of the poultry positioner with emphasis on the possible combinations of positioning the chickens.

The conveyor belt (50) has a camera sensor (56), which aims to identify the position of the poultry coming from the conveyor belt (40), and send a signal to collect and position the poultry. This camera (56) will send the command, as determined by the operator, to the 4 possible positions after the poultry is aligned, which are: Breast up and legs to the right (A); back up and legs to the left (B); breast up and legs to the left (C) and back up and legs to the right (D), as illustrated in FIG. 46.

The chickens leave the aligning belt (40) and are directed to the conveyor (50) with the camera installed (56) and at least one positioner (53), but preferably 4 positioners (53). This conveyor belt (50) works at a rated speed of 40 m/min, which may vary according to production; at this speed the expected production capacity for this arrangement is 100 chickens per minute.

Upon entering the conveyor belt, (50) the chickens pass through a capacitive sensor (their position on the conveyor can be adjusted) that in just milliseconds (this time varies, as it depends on the position of the sensor) activates the camera

(56) thus reading the position of the chicken on top of the conveyor belt (50), if it is breast or back up and if the neck or legs are forward, after identifying the chicken, the camera (56) sends a signal via ethernet communication to the PLC (Programmable Logic Controller) with the actions defined for each poultry, if they pass very close to each other the PLC will understand it as being out of position and discard the products.

Once the actions are defined by the camera (56) and sent to the PLC, the poultry continues on the conveyor belt (50) until it reaches the positioners (53) where the vane (51) with pneumatic activation controlled by the PLC (not represented) will pull the chicken to the defined positioner (53), this process of choosing which positioner (53) will be the chosen one is defined from the camera signal (56) and the activation time of each vane (51) depends on the speed of the conveyor belt and the distance of the selected positioner. Once the vane (51) pulls the poultry to the selected positioner (53), the process of stabilizing the poultry on the positioner will begin, a process that occurs in milliseconds, and directs the poultry to the tilting board (52), it can tilt to both sides from 0 to 90°, preferably 650. With the tilting board (52) tilted, the poultry will fall neck down, preferably passing through the tapered body (532) and then the outlet nozzle (533) that directs it to the container (61), this tilt will be the camera (56) that will define which side to tilt the tilting board (52), and in just milliseconds the tilting board (52) returns to its initial state ($0^c$ or 180°) thus leaving the poultry enclosed in the positioner (53). With the poultry enclosed, the PLC counts the number of containers (61) of the conveyor belt (60) operating at a rated speed of 25 m/min, positioned below the positioners (53), this is counted by an inductive sensor attached to the structure of the conveyor belt (60). This count, which is preliminarily adjusted by the operator according to production, sends a signal to start counting for a time of one thousandth of a second, and then the PLC sends a signal to open the bottom of the positioner (53) by means of the tilting mechanism (54), allowing the poultry to fall into the transport container (61). In any case, for the equipment to work regularly, the use of the conveyor belt (60) is dispensable, allowing its application in other production lines.

Figure 43:
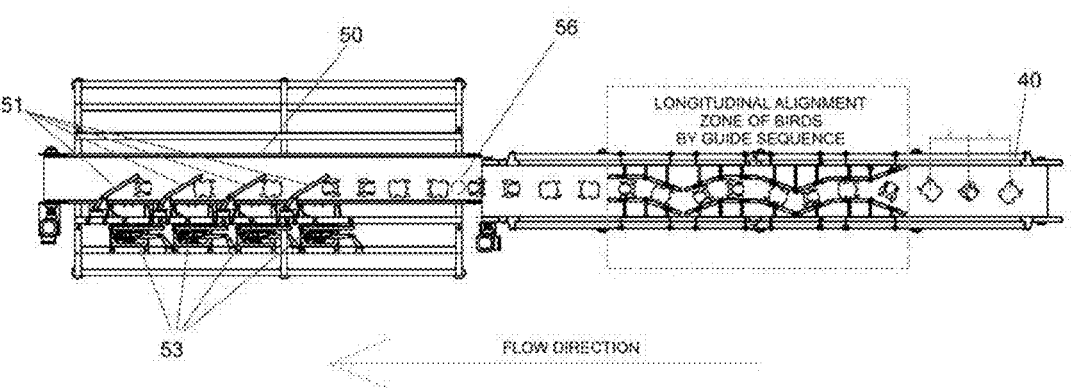
FIG. 43 represents the top view of the poultry positioner with emphasis on the chickens being directed to the positioners by the vanes.

As already described, the vertical poultry positioner (53) aims to collect the poultry from the conveyor (50) with the poultry collector vane (51), a mechanism that rotates at a fixed point and works similar to a door, and when opened receives the poultry and the closing movement leads the poultry into the positioner (53), as shown in FIGS. 42 and 43.

Figure 44:
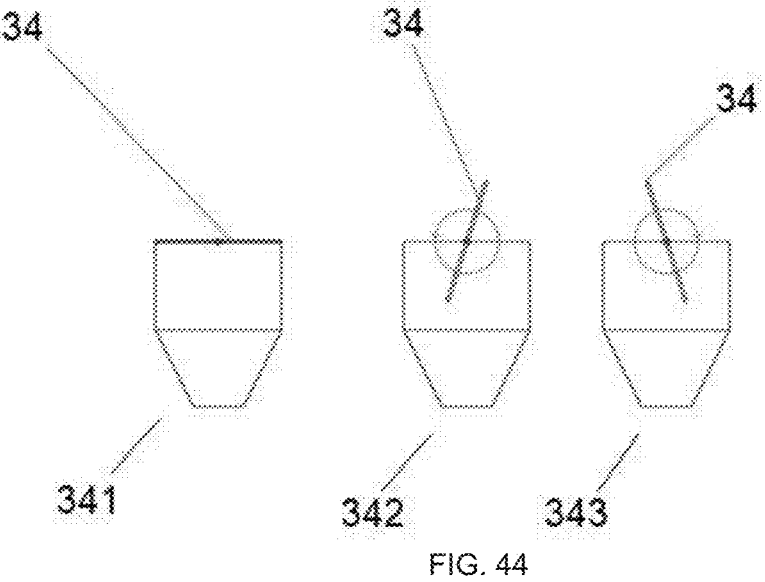
FIG. 44 depicts the front view of the poultry positioner with emphasis on the tilting board in 3 positions.

With the poultry inside the poultry positioner (53), the tilting board (52) is tilted to the correct side so that the poultry is "upright" or "upside down" and then placed into a container (61) that keeps the poultry in this adjusted position. The tilting board (52) has 3 positions as shown in FIG. 44, the working position is normally closed (341), and the positions (342) and (343) will be selected according to the position of the poultry that will be identified by the camera sensor (56).

Figure 45:
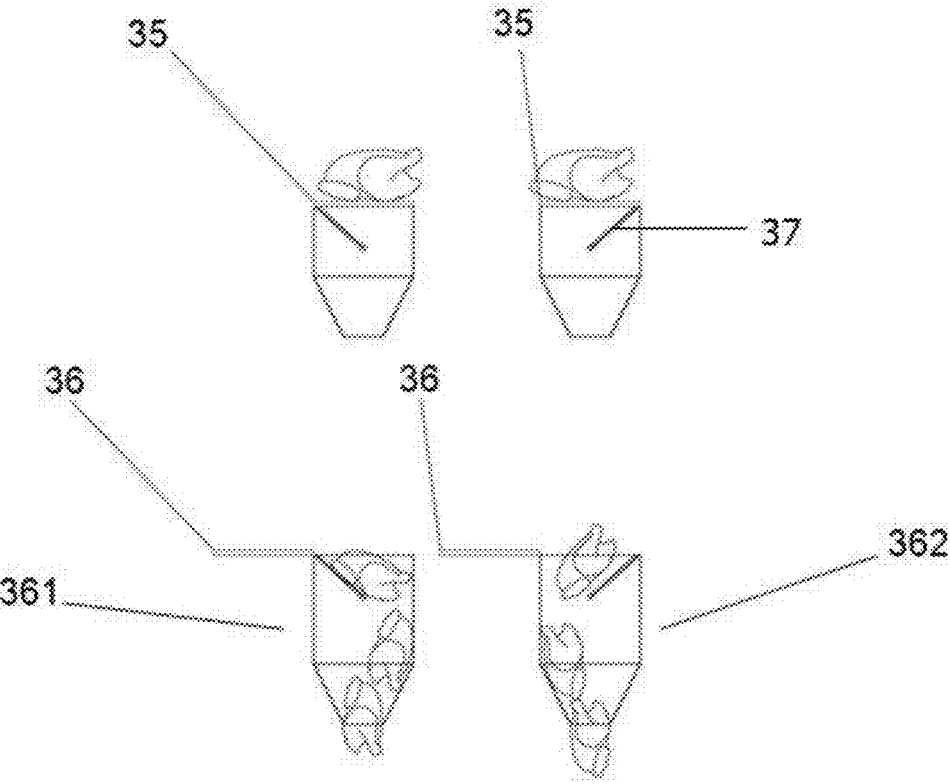
FIG. 45 depicts the front view of the poultry positioner with emphasis on the guillotine in 2 positions.

The same function described above can be performed with a variant in the design as illustrated in FIG. 45, at the top of the poultry positioner (53) there is a guillotine (35) that is open (36) so that the inclined shield (37) accommodates the poultry in the vertical direction, in the same way the shield (37) will alternate between positions (361) and (362) according to the decision made by the camera sensor (56). It is preferable for the poultry to be positioned upside down (340)(342)(344)(346) so that it can be easily hung up later, according to the arrangement of positions in FIG. 46; however, depending on the operator's decision, another arrangement of positions can be used that keeps the poultry "upright" (341)(343)(345)(347).

It is important to note that the drawings and description made do not have the power to limit the forms of execution of the inventive concept proposed herein, but rather to illustrate and explain the conceptual innovations disclosed in this solution. Thus, the descriptions and images must be interpreted in an illustrative and non-limiting manner, and there may be other equivalent or analogous forms of implementation of the inventive concept disclosed herein and that do not deviate from the protection spectrum outlined in the proposed solution.

The invention claimed is:

1. A positioning equipment for poultry and similar animal, comprising a collecting conveyor belt adjoining an aligning belt, which comprises metal plates fixed to the support bars arranged longitudinally by support elements, said bars being juxtaposed to the pieces by jaw clamps, equipped with holes; crossbars that receive fasteners and are connected to the holes; guide formed by flat plates equipped with slots in their upper region and organized by connectors; aligning belt adjoining a vertical positioning conveyor, which comprises at least one flat plate fixed to at least one vertical positioner, said positioner being equipped with a collector vane juxtaposed to the movable wall, and facing this wall, there is a fixed wall; it also has a tapered body juxtaposed to an outlet nozzle by interlocking members, said nozzle being equipped with a clip attached by fasteners inserted into slots and joined, by a component equipped with a cavity, to an oblique element with thread and in the space formed by the fixed wall, the movable wall and the vane, sheltering a tilting board connected to a pneumatic system that is coupled to the flat plate.

2. The equipment according to claim 1, wherein the conveyor belt comprises a juxtaposed blocking element, and is equipped with hangers, connected by fasteners.

3. The equipment according to claim 1, wherein the guide is formed by flat plates with hooks and loops that together form a hinge by fasteners.

4. The equipment according to claim 1, wherein the guide has flat plates positioned at an angle of 15 to 75° degrees.

5. The equipment according to claim 1, wherein the jaw clamps are coupled to the support bars and the fasteners to the slots by fasteners.

6. The equipment according to claim 1, wherein the collector vane is juxtaposed to the movable semicircular wall and, facing this wall, has a fixed semicircular wall.

7. The equipment according to claim 1, comprising at least one vertical positioner, up to 4 vertical positioners.

8. The equipment according to claim 1, comprising a tilting pneumatic mechanism, positioned above the base fixed to the structure by joining elements and equipped with a circular cavity.

9. The equipment according to claim 1 wherein the conveyor belt comprises a camera sensor for identifying the position of the poultry from the conveyor belt, sending a signal for collection and positioning.

10. The equipment according to claim 1, wherein the tilting board can be tilted, to both sides, from 0 to 90°, but preferably 65°.

11. The equipment according to claim 1, wherein the vane has a pneumatic drive controlled by PLC (Programmable Logic Controller).

12. The equipment according to claim 1, wherein the positioner has a guillotine and inclined guard that places the poultry in a vertical position.

13. A separation method for poultry and similar animal, comprising the following steps:
  a) supply the collection conveyor belt with slaughtered poultry;
  b) direct the poultry to the aligning belt and pass through the guide;
  c) send the sorted poultry to the conveyor belt;
  d) pass the poultry through a capacitive sensor that activates the camera;
  e) identify the position of the poultry through the camera sensor;
  f) the vane converges the poultry towards the positioner;
  g) activate the tilting board and allowing the poultry to drop into to the exit;
  h) the tilting board returns to the initial state (0° or) 180°;
  i) the tilting pneumatic mechanism releasing the poultry.

14. The method according to claim 11, wherein in step a) the poultry are arranged in spaces (X) between 300 to 500 mm from center to center.

15. The method according to claim 11, wherein in step a) the conveyor belt operates at a rated speed of 40 m/min.

16. The method according to claim 11, wherein in step b) the conveyor belt operates at a rated speed of 50 m/min.

17. The method according to claim 11, wherein in step c) the conveyor belt operates at a rated speed of 40 m/min.

18. The method according to claim 11, wherein in step e) after identifying the chicken, the camera sends a signal via ethernet communication to the PLC (Programmable Logic Controller) with the actions defined for each poultry.

19. The method according to claim 11, wherein in step f) the vane converges the poultry towards the positioner by a PLC-controlled pneumatic drive.

20. The method according to claim 11, wherein in step g) the tilting board directs the poultry neck down.

* * * * *